(12) United States Patent
Hayashi

(10) Patent No.: US 9,612,818 B2
(45) Date of Patent: Apr. 4, 2017

(54) INFORMATION PROCESSING APPARATUS, PROGRAM MANAGEMENT METHOD FOR INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Ruri Hayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/806,951

(22) Filed: Jul. 23, 2015

(65) Prior Publication Data

US 2016/0034264 A1    Feb. 4, 2016

(30) Foreign Application Priority Data

Aug. 4, 2014 (JP) .................................. 2014-158991

(51) Int. Cl.
*G06F 9/44* (2006.01)
*G06F 9/445* (2006.01)
(Continued)

(52) U.S. Cl.
CPC .................. *G06F 8/61* (2013.01); *G06F 3/12* (2013.01); *G06F 8/62* (2013.01); *G06F 9/44526* (2013.01); *H04L 67/34* (2013.01)

(58) Field of Classification Search
CPC ............ G06F 8/61–8/65; G06F 9/4425; G06F 9/44526; G06F 3/12
See application file for complete search history.

(56) References Cited

U.S. PATENT DOCUMENTS

| 8,176,321 | B1 * | 5/2012 | Perry | ...................... | G06F 21/53 713/167 |
| 2004/0015956 | A1 * | 1/2004 | Barfield | .................... | G06F 8/62 717/174 |

(Continued)

FOREIGN PATENT DOCUMENTS

JP     2001-084137 A    3/2001

OTHER PUBLICATIONS

Ben Nadel, Extending Classes in Object Oriented Javascript, 2009, pp. 1-15.*

(Continued)

*Primary Examiner* — Thuy Dao
*Assistant Examiner* — Mongbao Nguyen
(74) *Attorney, Agent, or Firm* — Carter, DeLuca, Farrell & Schmidt, LLP

(57) ABSTRACT

An information processing apparatus provided with an extension unit, the extension unit comprises a unit that performs control to download an introduction program that provides information about an extension program for extending functionality which can be downloaded and to install the introduction program; a unit that obtains, from the installed introduction program, information about an extension program which can be downloaded; a unit that performs control to download the extension program that can be downloaded and install the extension program that can be downloaded, based on the information obtained from the introduction program, in response to receiving an instruction to install the extension program which can be downloaded; and a unit that performs control to uninstall the installed extension program, based on limitation information for the extension program, which is included in the information obtained from the introduction program.

7 Claims, 26 Drawing Sheets

(51) Int. Cl.
*H04L 29/08* (2006.01)
*G06F 3/12* (2006.01)

(56) References Cited

U.S. PATENT DOCUMENTS

| | | | | |
|---|---|---|---|---|
| 2004/0015959 A1* | 1/2004 | Kobayashi | G06F 9/4411 | 717/174 |
| 2005/0083877 A1* | 4/2005 | Zilliacus | G06F 21/10 | 370/328 |
| 2005/0108704 A1* | 5/2005 | Marinelli | G06F 8/61 | 717/174 |
| 2008/0046720 A1* | 2/2008 | Sugishita | G06F 21/629 | 713/156 |
| 2008/0163198 A1* | 7/2008 | Rao | G06F 8/61 | 717/177 |
| 2009/0080013 A1* | 3/2009 | Sato | H04N 1/00204 | 358/1.15 |
| 2010/0313029 A1* | 12/2010 | Abeln | G06F 9/44526 | 713/176 |
| 2010/0318964 A1* | 12/2010 | Bouldin | G06F 8/75 | 717/120 |
| 2011/0072421 A1* | 3/2011 | Parry | G06F 8/65 | 717/168 |
| 2011/0093813 A1* | 4/2011 | Watanabe | G06F 8/61 | 715/810 |
| 2011/0202915 A1* | 8/2011 | Kuroyanagi | G06F 8/61 | 717/178 |
| 2012/0072871 A1* | 3/2012 | Seo | H04N 5/445 | 715/838 |
| 2012/0137312 A1* | 5/2012 | Asahara | G06F 3/1203 | 719/321 |
| 2013/0047150 A1* | 2/2013 | Malasky | G06F 9/44547 | 717/176 |
| 2013/0247030 A1* | 9/2013 | Kay | H04L 67/34 | 717/178 |
| 2013/0326499 A1* | 12/2013 | Mowatt | G06F 8/60 | 717/177 |
| 2014/0082608 A1* | 3/2014 | Hayami | G06F 13/12 | 717/175 |
| 2015/0089491 A1* | 3/2015 | Wang | G06F 3/04817 | 717/175 |
| 2015/0220316 A1* | 8/2015 | Dotan-Cohen | H04W 4/003 | 717/168 |

OTHER PUBLICATIONS

Scott Mitchell, Extending Base Type Functionality with Extension Methods, 2007, pp. 1-6.*
IBM, Extending the functionality of IBM Workplace Forms with the Function Call Interface, 2007, pp. 1-9.*

* cited by examiner

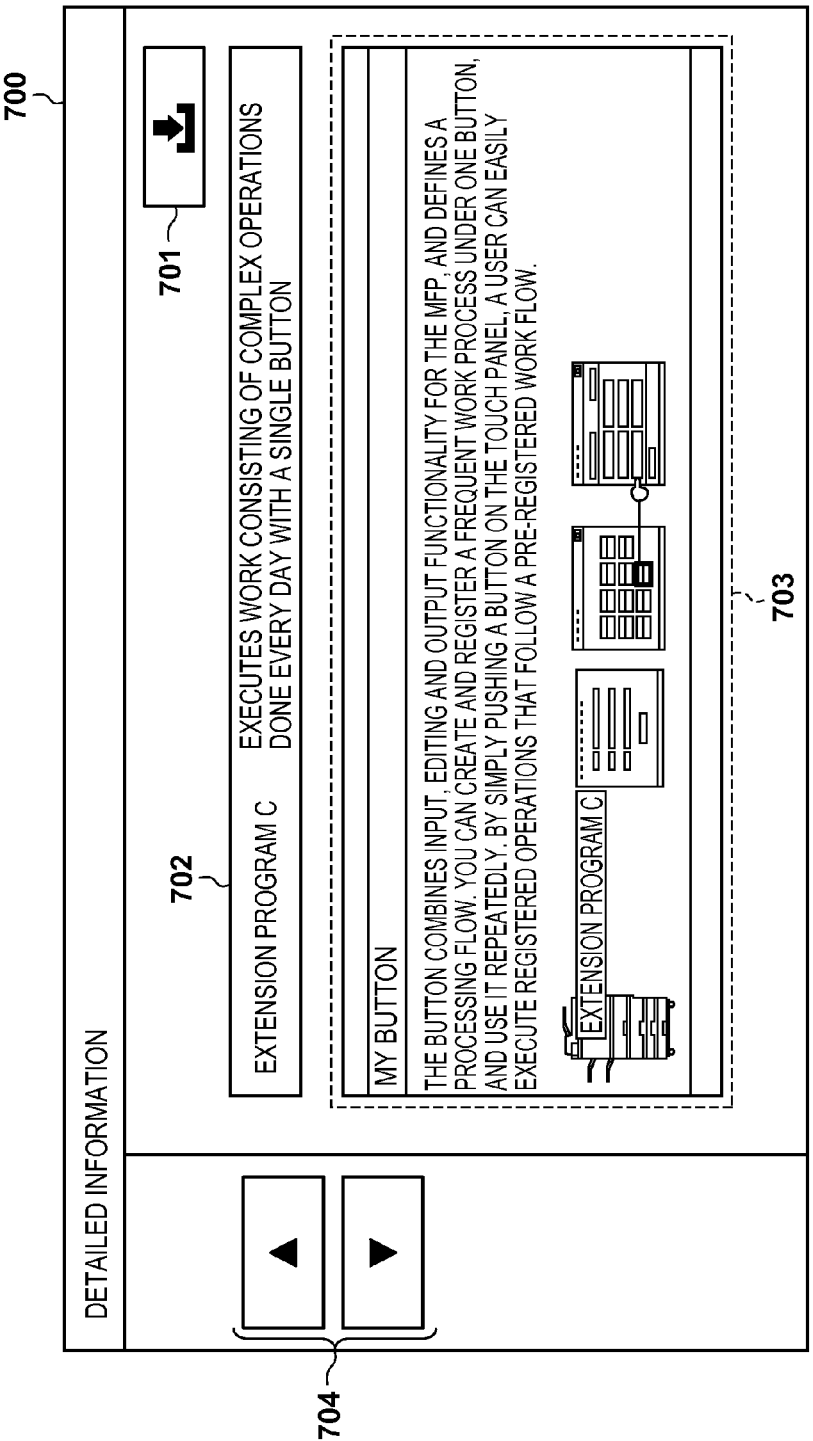

FIG. 12A

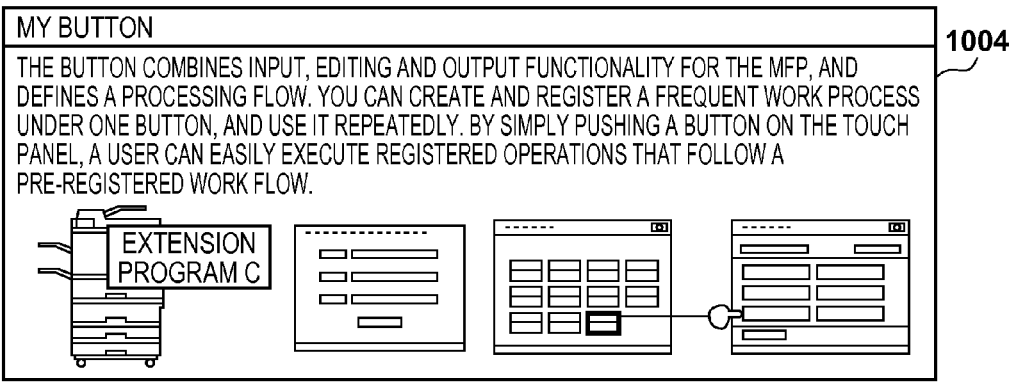

MY BUTTON

THE BUTTON COMBINES INPUT, EDITING AND OUTPUT FUNCTIONALITY FOR THE MFP, AND DEFINES A PROCESSING FLOW. YOU CAN CREATE AND REGISTER A FREQUENT WORK PROCESS UNDER ONE BUTTON, AND USE IT REPEATEDLY. BY SIMPLY PUSHING A BUTTON ON THE TOUCH PANEL, A USER CAN EASILY EXECUTE REGISTERED OPERATIONS THAT FOLLOW A PRE-REGISTERED WORK FLOW.

explanation_1.png

FIG. 12B

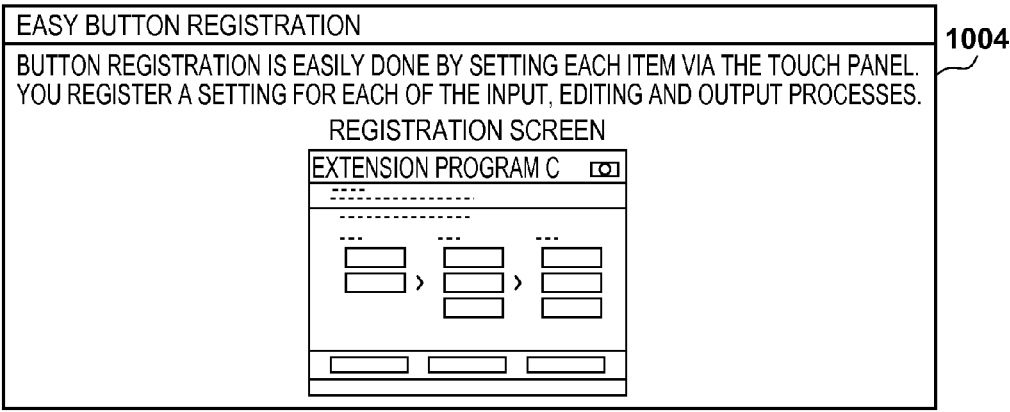

EASY BUTTON REGISTRATION

BUTTON REGISTRATION IS EASILY DONE BY SETTING EACH ITEM VIA THE TOUCH PANEL. YOU REGISTER A SETTING FOR EACH OF THE INPUT, EDITING AND OUTPUT PROCESSES.

explanation_2.png

FIG. 12C

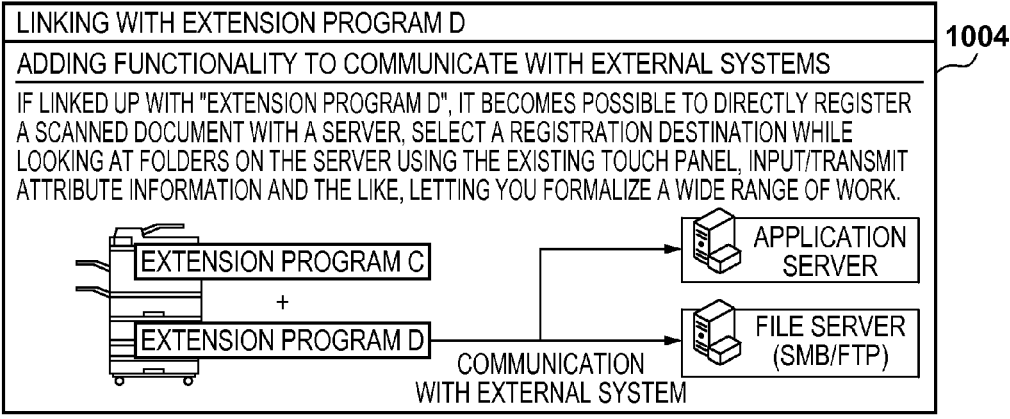

LINKING WITH EXTENSION PROGRAM D

ADDING FUNCTIONALITY TO COMMUNICATE WITH EXTERNAL SYSTEMS

IF LINKED UP WITH "EXTENSION PROGRAM D", IT BECOMES POSSIBLE TO DIRECTLY REGISTER A SCANNED DOCUMENT WITH A SERVER, SELECT A REGISTRATION DESTINATION WHILE LOOKING AT FOLDERS ON THE SERVER USING THE EXISTING TOUCH PANEL, INPUT/TRANSMIT ATTRIBUTE INFORMATION AND THE LIKE, LETTING YOU FORMALIZE A WIDE RANGE OF WORK.

explanation_3.png

ListButton.png

DetailTitle.png

Icon.png

| | |
|---|---|
| Application-Id : | c9f8d37e-010d-1000-a8e3-00e000c4ae6f |
| Bundle-Name : | EXTENSION PROGRAM C |
| Bundle-Version : | 2.2.02 |

⎫
⎬ 1401
⎭

| | |
|---|---|
| MaximumMemoryUsage : | 1024 |
| MaximumThreadUsage : | 10 |
| MaximumFilespaceUsage : | 8192 |

| | |
|---|---|
| Application-Id : | 3352ae9-8e15-4b79-925-9a72a9e71b1e |
| Bundle-Name : | EXTENSION PROGRAM E |
| Bundle-Version : | 1.1.10 |

⎫
⎬ 1401
⎭

| | |
|---|---|
| MaximumMemoryUsage : | 1024 |
| MaximumThreadUsage : | 10 |
| MaximumFilespaceUsage : | 8192 |

⎫
⎬ 1402
⎭

| | |
|---|---|
| Servlet-URL : | /servlet |

1501 — AppName : EXTENSION PROGRAM C
AppSummary : This program provides MyButton solution. ～1502

1501 — AppName : EXTENSION PROGRAM C
AppSummary : 便利な複合機の機能を入力・編集・出力フェーズで複数組み合わせて「マイボタンソリューション」を提供します。～1502

| Application-Id (1801) | Bundle-Name (1802) | APPLICATION TYPE (1803) | USABLE DAY NUMBER (1804) | USABLE COUNT (1805) | FUNCTION TYPE (1806) |
|---|---|---|---|---|---|
| c9f8d37e-010d-1000-a8e3-00e000c4ae6f | EXTENSION PROGRAM C | APPLET | - | 100 | Copy |
| 33529ae9-8e15-4b79-925d-9a72a9e71b1e | EXTENSION PROGRAM E | SERVLET | - | 100 | Scan |
| aaaaaaaa-aaaa-aaaa-aaaa-aaaaaaaaaaaa | EXTENSION PROGRAM F | ESPLET | 100 | - | - |
| bbbbbbbb-bbbb-bbbb-bbbb-bbbbbbbbbbbb | EXTENSION PROGRAM F | APPLET | - | - | - |

| Application-Id (1801) | USABLE DAY NUMBER (1804) | USABLE COUNT (1805) | FUNCTION TYPE (1806) | NUMBER OF DAYS ELAPSED (1807) | USE COUNT (1808) | STATUS (1809) |
|---|---|---|---|---|---|---|
| c9f8d37e-010d-1000-a8e3-00e000c4ae6f | - | 100 | Copy | - | 10 | START |
| 33529ae9-8e15-4b79-925d-9a72a9e71b1e | 100 | - | Scan | - | 100 | LIMIT EXPIRATION |
| aaaaaaaa-aaaa-aaaa-aaaa-aaaaaaaaaaaa | - | - | - | 20 | - | START |
| bbbbbbbb-bbbb-bbbb-bbbb-bbbbbbbbbbbb | - | - | - | - | - | NOT INSTALLED |

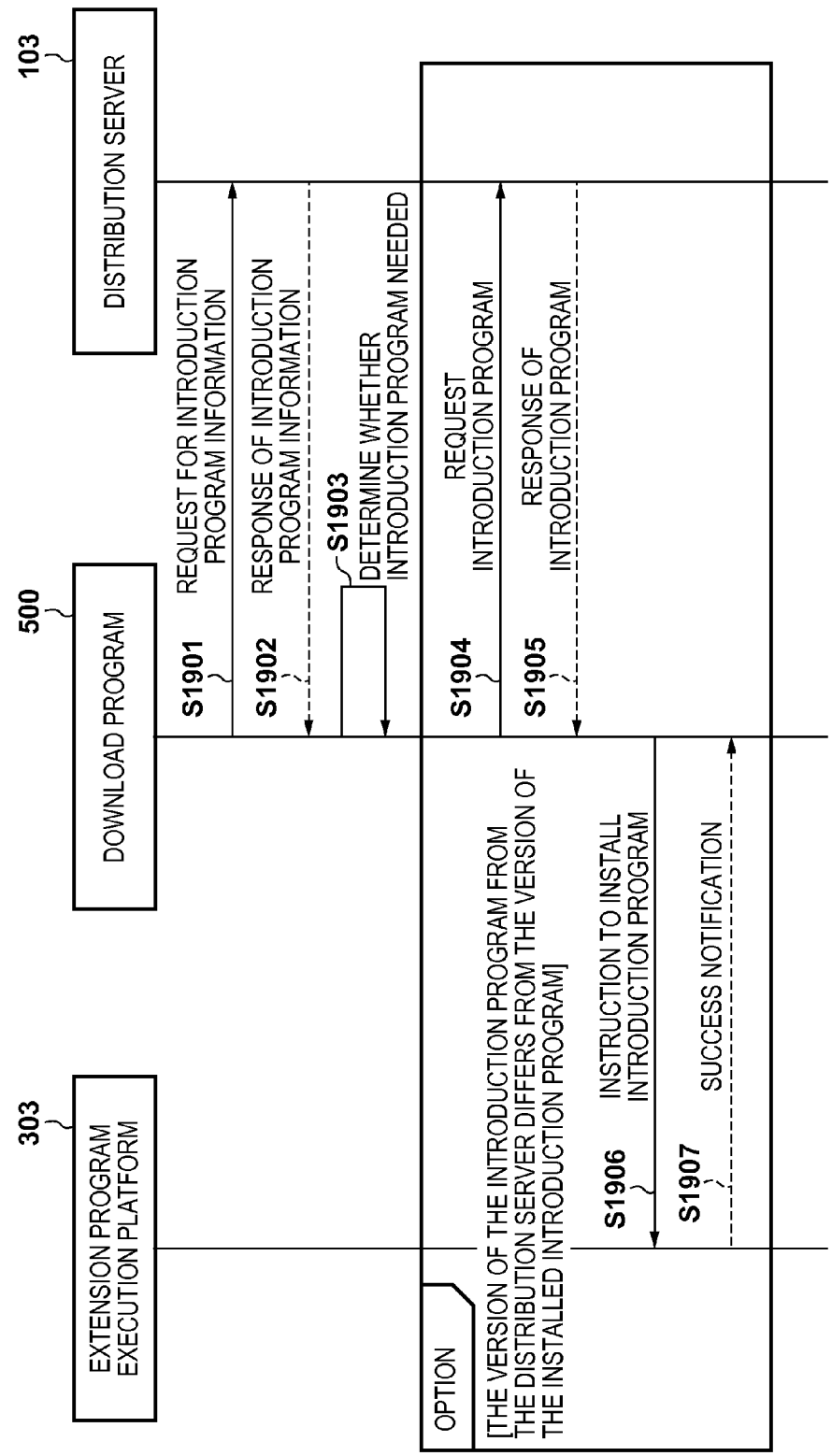

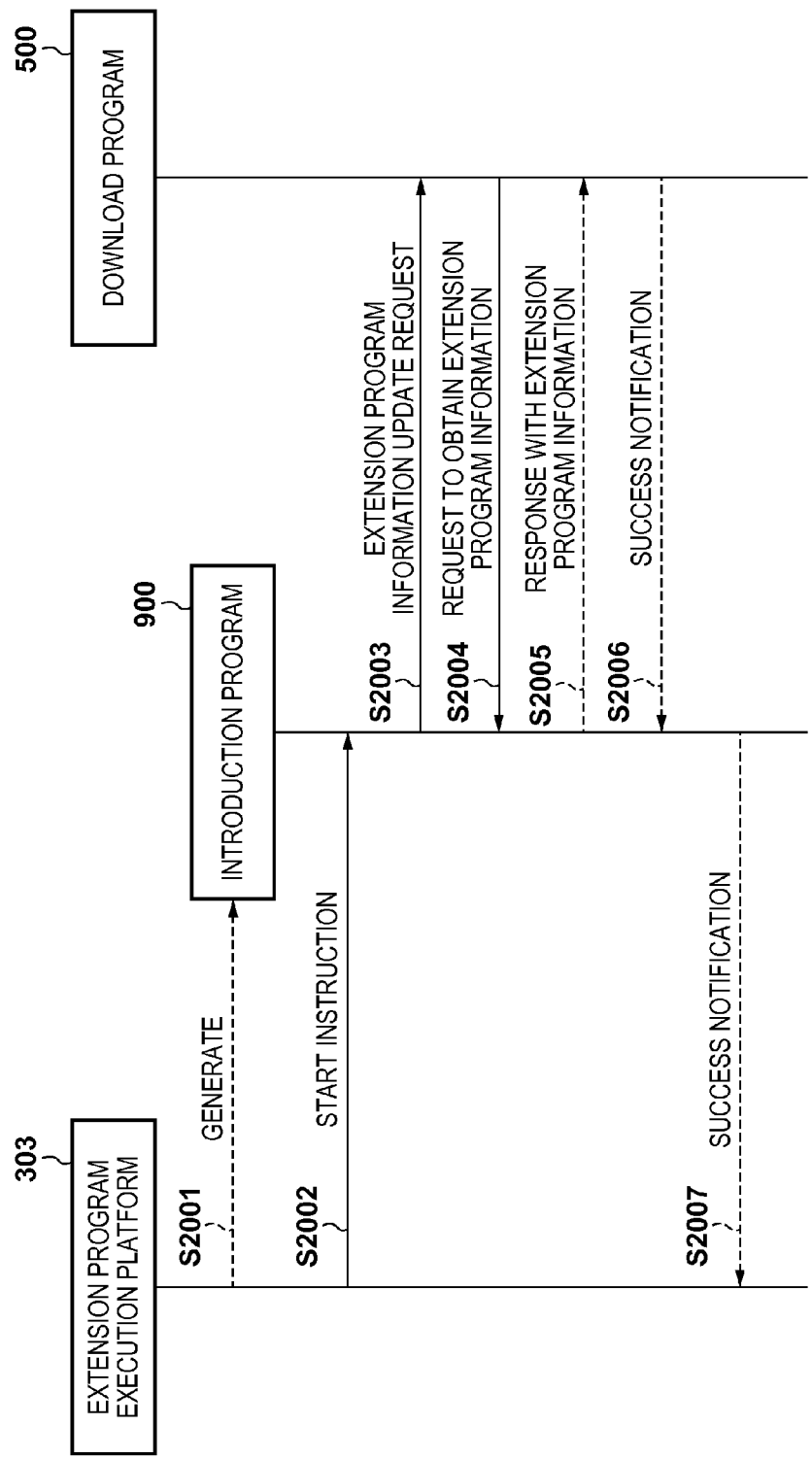

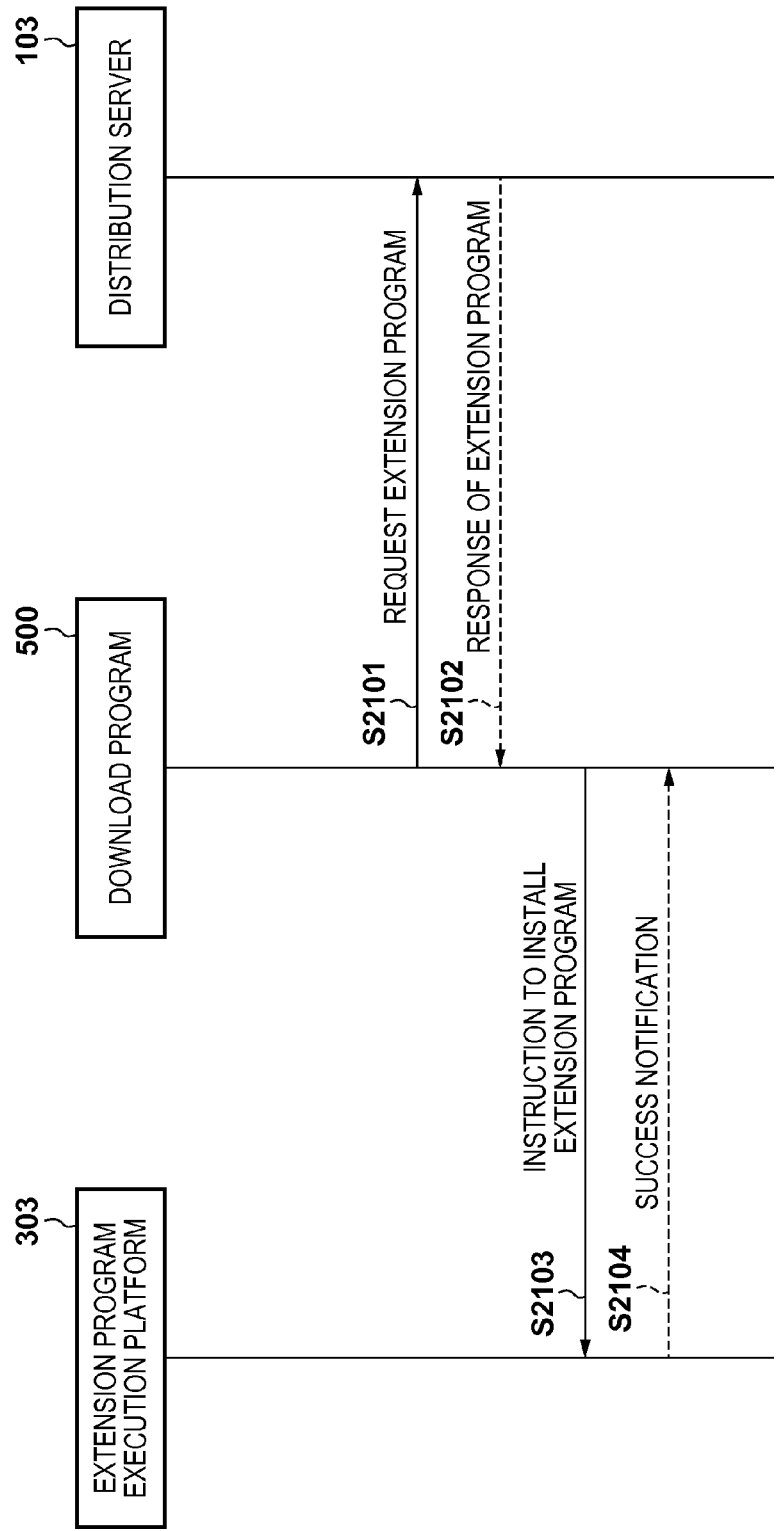

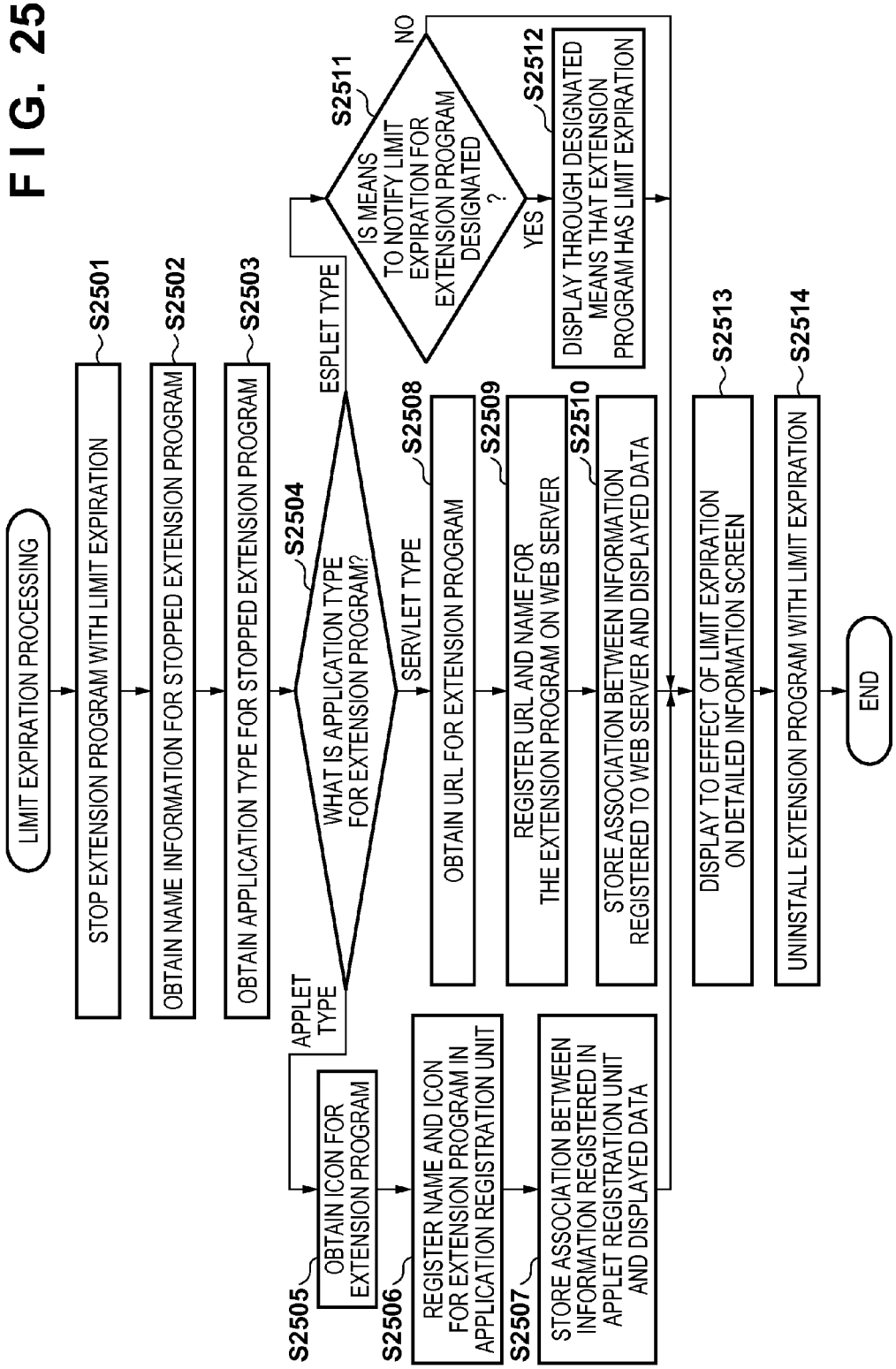

INFORMATION PROCESSING APPARATUS, PROGRAM MANAGEMENT METHOD FOR INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing apparatus, a program management method for an information processing apparatus, and a non-transitory computer readable medium.

Description of the Related Art

In recent years, systems capable of extending the functions of an image forming apparatus located in an office dynamically by installation of programs for function extension on the image forming apparatus are spreading. For example, one type of this system is Canon Inc.'s MEAP (registered trademark), or the like.

Also, techniques for preventing unauthorized usage of applications by monitoring license information, operating status, or the like, for a management target application are known (refer to Japanese Patent Laid-Open No. 2001-84137, for example).

In the above described system, when it is envisioned that under certain conditions a for-profit function extension program is allowed to be used for free, it is necessary to modify the function extension program, to hold the conditions under which it is possible to use the program for free, and to have a function for stopping the function extension program in accordance with the conditions. Further, there is the issue that in programs for function extension that will be developed hereafter, double development, and double management of a program for function extension that is stopped depending on certain conditions, and the normal program for function extension is necessary, and so maintenance and development costs rise.

Also, even if a function for monitoring an application and causing its usage to be stopped is employed as in Japanese Patent Laid-Open No. 2001-84137, it will be necessary to add conditions by which it is possible to use programs for function extension installed later for free to the monitoring means, and image forming apparatus function extension will be necessary. For this reason, there will be a maintenance burden.

SUMMARY OF THE INVENTION

In view of the above described issues, the present invention provides an information processing apparatus comprising a means for performing management of limitations of programs for function extension simply and at low-cost, to make it possible to use programs for function extension with limitations.

According to one aspect of the present invention, there is provided an information processing apparatus provided with an extension unit for performing control to download an extension program for extending functionality from an external server and to install the extension program, the extension unit comprising: a first install control unit configured to perform control to download from the external server an introduction program that provides information about an extension program which can be downloaded from the external server, and to install the introduction program; an obtaining unit configured to obtain, from the installed introduction program, information about an extension program which can be downloaded; a second install control unit configured to perform control to download the extension program that can be downloaded from the external server and install the extension program that can be downloaded, based on the information obtained from the introduction program by the obtaining unit, in response to receiving an instruction to install the extension program which can be downloaded; and a uninstall control unit configured to perform control to uninstall the installed extension program, based on limitation information for the extension program, which is included in the information obtained from the introduction program by the obtaining unit.

According to another aspect of the present invention, there is provided a program management method in an information processing apparatus provided with an extension unit for performing control to download an extension program for extending functionality from an external server and to install the extension program, the method comprising: by the extension unit, a first install control step of performing control to download from the external server an introduction program that provides information about an extension program which can be downloaded from the external server, and to install the introduction program; an obtaining step of obtaining, from the installed introduction program, information about an extension program which can be downloaded; a second install control step of performing control to download the extension program that can be downloaded from the external server and install the extension program that can be downloaded, based on the information obtained from the introduction program in the obtaining step, in response to receiving an instruction to install the extension program which can be downloaded; and a uninstall control step of performing control to uninstall the installed extension program, based on limitation information for the extension program, which is included in the information obtained from the introduction program by the obtaining step.

According to another aspect of the present invention, there is provided a non-transitory computer readable medium storing a program for causing a computer to function as a first install control unit configured to perform control to download from an external server an introduction program that provides information about an extension program which can be downloaded from the external server, and to install the introduction program; an obtaining unit configured to obtain, from the installed introduction program, information about an extension program which can be downloaded; a second install control unit configured to perform control to download the extension program that can be downloaded from the external server and install the extension program that can be downloaded, based on the information obtained from the introduction program by the obtaining unit, in response to receiving an instruction to install the extension program which can be downloaded; and a uninstall control unit configured to perform control to uninstall the installed extension program, based on limitation information for the extension program, which is included in the information obtained from the introduction program by the obtaining unit.

According to the present invention, an information processing apparatus that can realize usage of an extension program with a limitation for a fixed interval or a fixed number of times without changing the already existing extension program can be provided.

Further features of the present invention will become apparent from the following description of exemplary embodiments (with reference to the attached drawings).

BRIEF DESCRIPTION OF THE DRAWINGS

FIGS. 7A and 7B are views for showing examples of a distributable extension program details screen in accordance with the present application invention.

FIGS. 12A, 12B and 12C are views for showing examples of information included in the distributable extension program information in accordance with the present application invention.

FIGS. 14A and 14B are views for showing examples of information included in the distributable extension program information in accordance with the present application invention.

FIGS. 15A and 15B are views for showing examples of information included in the distributable extension program information in accordance with the present application invention.

FIGS. 18A and 18B are views for showing examples of extension program limitation management tables in accordance with the present application invention.

FIG. 19 is a view for showing a download process for the introduction program in accordance with the present application invention.

FIG. 20 is a view for showing an update process for the introduction program in accordance with the present application invention.

FIG. 21 is a view showing a download process for the extension program according to the present application invention.

FIG. 25 is a view for showing stopping processing for the extension program in accordance with the present application invention.

DESCRIPTION OF THE EMBODIMENTS

<First Embodiment>
[System Configuration]

Figure 1:
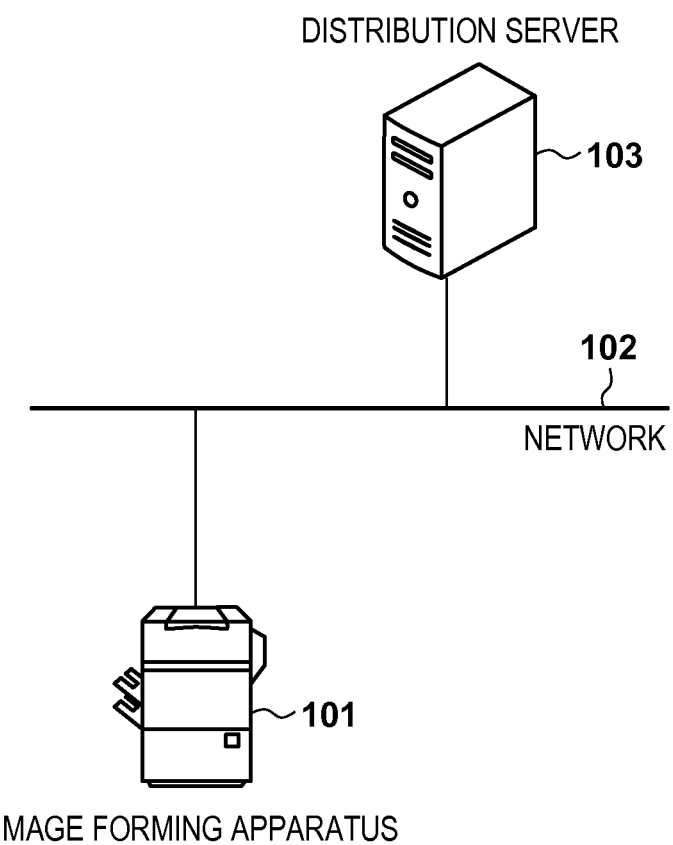
FIG. 1 is a view for illustrating an example configuration of a distribution system in accordance with the present application invention.

Below, the drawings are used to explain embodiments according to the present invention. FIG. 1 is a view for showing an example of a device configuration of a distribution system that includes an image forming apparatus capable of applying a program management method according to the present application invention. The distribution system including the image forming apparatus of the present application invention is comprised by an image forming apparatus 101, a network 102, and a distribution server 103. Note that, while not shown, the image forming apparatus 101 is connected to a client, and performs predetermined processing in response to an instruction from the client. The client (not shown) has a Web browser, and the Web browser transmits a request in an HTTP format to a Web server system of the image forming apparatus 101. Regarding an application according to the present application invention, there is a plurality of types, such as those that cooperate with the Web browser, and details of these types are explained later.

The image forming apparatus 101 is a multi-function peripheral (MFP: Multi Function Peripheral) which integrates a plurality of functions, such as a scanner function, a printer function, a facsimile function and a file transmission function. The image forming apparatus 101 is connected to the network 102. The network 102 is a so-called a computer network, and is a communication network capable of freely exchanging information between devices connected thereto. The network 102 may exist at various scales, such as a LAN (Local Area Network) or the Internet, but may be of any scale in the present embodiment. The distribution server 103 is an external server capable of holding and managing extension programs, and of distributing an extension program in response to a request from another device, such as the image forming apparatus 101. Also, the distribution server 103 is connected to the network 102. Because the image forming apparatus 101 and the distribution server 103 are both connected to the network 102, they are able to exchange information freely.

Note that while a single instance of the image forming apparatus 101 is shown in FIG. 1, a plurality may be included. The processing of the distribution server 103 may be distributed to a plurality of physically separate information processing apparatuses. An image forming apparatus is given as an example of a device that performs function extension in the present embodiment, but said device may be another information processing apparatus, such as a PC.

[Image Forming Apparatus]

Figure 2:
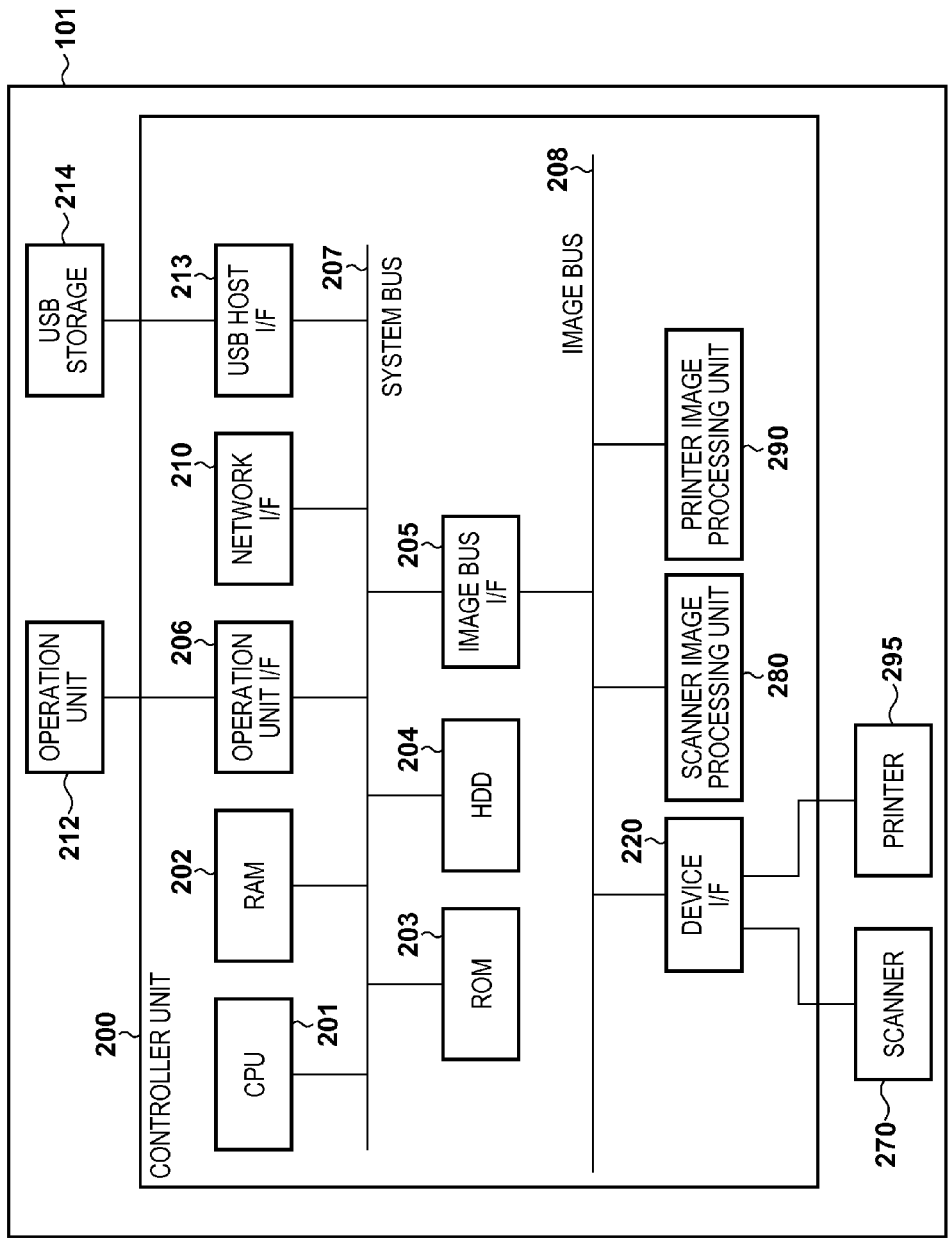
FIG. 2 is a view for illustrating an example configuration of main parts of an image forming apparatus in accordance with the present application invention.

FIG. 2 is a block diagram for showing an example configuration of main components of the image forming apparatus 101. The image forming apparatus 101 includes a controller unit 200. The controller unit 200 is connected to a scanner 270, which is an image input device, a printer 295, which is an image output device, and an operation unit 212. The controller unit 200 performs control to realize a copy function by printing out image data, read by the scanner 270, by means of the printer 295.

The controller unit 200 includes a CPU 201. The CPU 201 starts up an OS (Operating System) by means of a boot program stored in a ROM 203. The CPU 201, via the OS, executes a program stored on an HDD (Hard Disk Drive) 204, and thereby executes various later described types of processes. A RAM 202 provides a work area and also provides an image memory area for temporarily storing image data. The RAM 202 is also used as a work area for the CPU 201. The HDD 204 is a non-volatile storage region, and stores various programs and image data.

The CPU 201 is connected to the ROM 203, the RAM 202, an operation unit I/F (interface) 206, a network I/F 210, a USB host I/F 213 and an image bus I/F 205, through a system bus 207. The operation unit I/F 206 is an interface for the operation unit 212, which has a touch panel, and outputs to the operation unit 212 image data to be displayed on the operation unit 212. The operation unit I/F 206 sends information, input by a user through the operation unit 212, to the CPU 201.

The network I/F 210 is an interface for connecting the image forming apparatus 101 to the network 102. The USB host I/F 213 is an interface that communicates with a USB storage 214. The USB host I/F 213 outputs data stored in the HDD 204 to the USB storage 214. The USB host I/F 213 also obtains data stored in the USB storage 214, and transfers said data to the CPU 201. The USB host I/F 213 is able to be connected to a plurality of USB devices, including the USB storage 214. The USB storage 214 is an external storage apparatus that stores data, and is removable with regard to the USB host I/F 213.

The image bus I/F 205 connects the system bus 207 to an image bus 208, which transfers image data at high speed, and is a bus bridge for converting data formats. The image bus 208 is configured by a PCI bus, IEEE 1394 or the like. A device I/F 220, a scanner image processing unit 280, and a printer image processing unit 290 are provided on the image bus 208. The scanner 270 and the printer 295 are connected to the device I/F 220, and the device I/F 220 performs conversion between synchronous and asynchronous systems for image data. The scanner image processing unit 280 performs correction, modification and editing for input image data. The printer image processing unit 290 performs correction, resolution conversion and the like in accordance with the printer 295 for printed output image data.

[Software Configuration]

Figure 3:
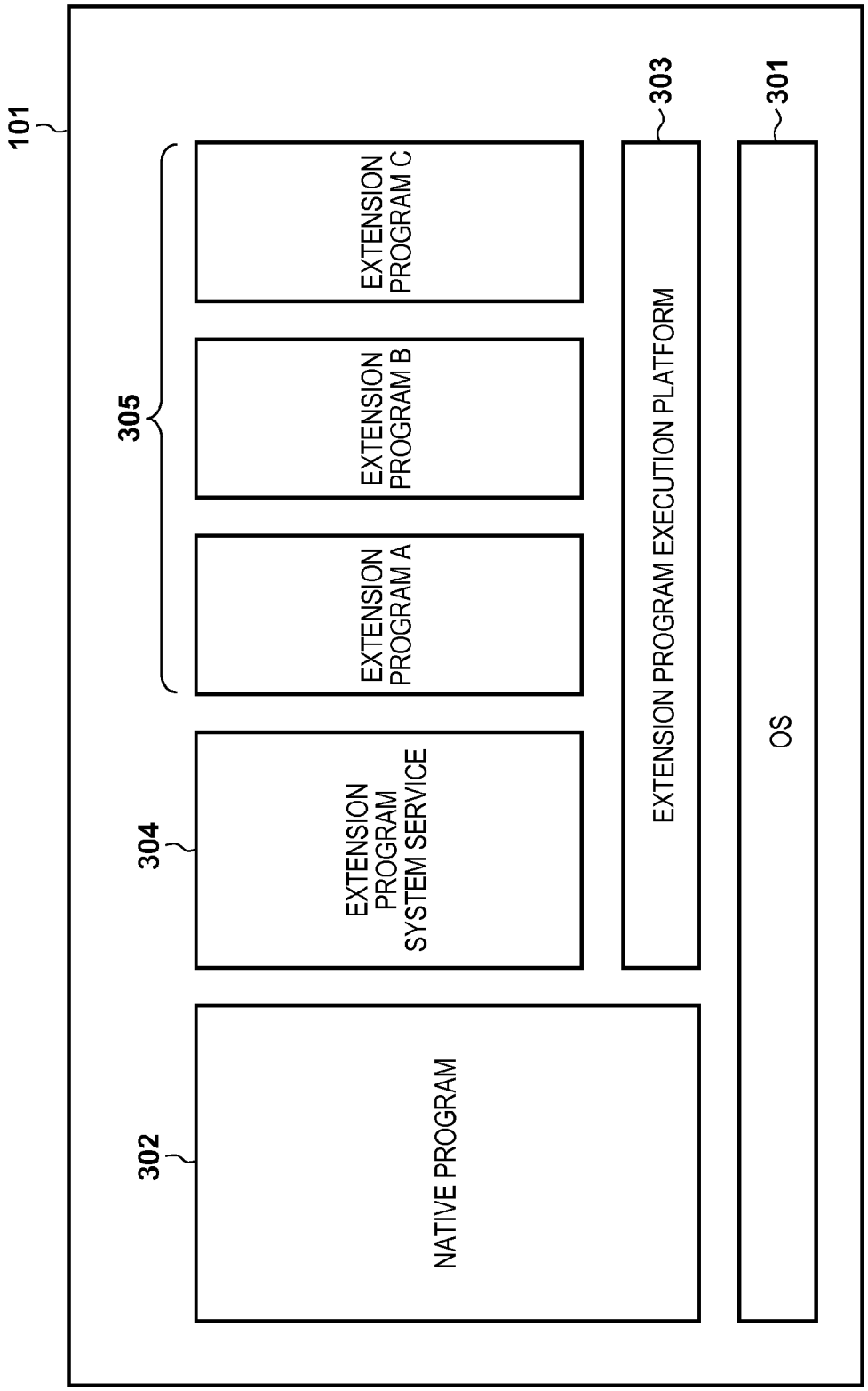
FIG. 3 is a view for illustrating an example configuration of software of the image forming apparatus in accordance with the present application invention.

FIG. 3 is a view for illustrating an example configuration of software in the image forming apparatus 101. Operating on an OS 301 are a native program 302, which is a program for controlling printers, fax machines, scanners and the like, and an extension program execution platform 303, which is a platform for executing extension programs 305. The extension program execution platform 303 is, for example, a program for realizing dynamic addition and deletion of programs, and implements the OSGi (Open Service Gateway initiative) framework. An extension program system service 304 is a service that provides shared functions used by the extension programs 305. By the extension programs 305 calling a function of the extension program system service 304, effort to develop shared functions used by the extension programs 305 can be reduced.

Each of the extension programs 305 is a program, operating on the extension program execution platform 303, for extending the functions of the image forming apparatus 101, and is capable of being installed/uninstalled as necessary. Each of the extension programs 305 is capable of being started/stopped as necessary, and when stopped, resources for processing are not consumed, and services and functions are not provided. Each of the extension programs 305 is capable of accessing each module of the image forming apparatus 101, such as another extension program or the RAM 202, via the extension program execution platform 303 or the extension program system service 304. Those of the extension programs 305 that have a UI (User Interface) are capable of displaying an icon on a main menu screen displayed on the operation unit 212 of the image forming apparatus 101. When the operation unit I/F 206 detects that a user has selected an icon via the operation unit 212, the operation unit I/F 206 transmits to the CPU 201 something to that effect. Upon receiving said transmission, the CPU 201 displays the UI for the extension program selected by the user on the operation unit 212.

Figure 5:
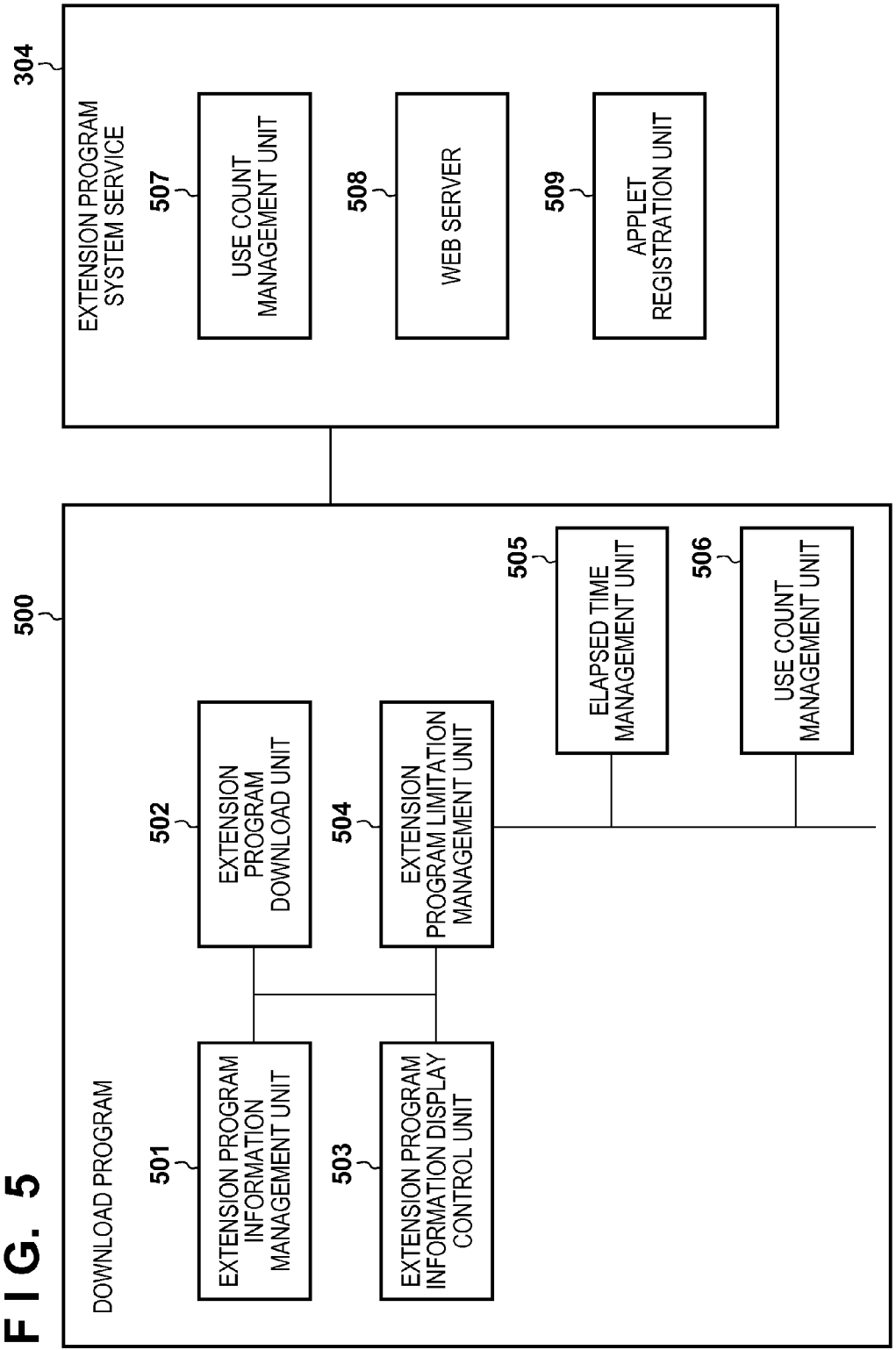
FIG. 5 is a view for showing an example of a functional configuration of the distribution system in accordance with the present application invention.

A download program 500 which will be explained later using FIG. 5 may be included in the extension programs 305. Additionally, the download program 500 itself has a function to download and install on the image forming apparatus 101 the extension programs 305. Therefore, in the present embodiment, other extension programs are installed in the image forming apparatus 101 through a different method. The different method may be, for example, a method using a function provided by the image forming apparatus 101 as a standard function, wherein an extension program is installed through a manual operation. An introduction program 900 may be given as a kind of the extension programs 305. Details of the introduction program 900 are explained later, but installation control of the introduction program 900 is performed by the download program 500. In the present specification, for convenience, control of installation of the introduction program 900 is also referred to as "first installation control", and control of installation of those of the extension programs 305 other than the introduction program 900 is referred to as "second installation control".

Note that the software configuration shown in FIG. 3 only describes basic portions, and other services or the like may be included in accordance with the execution environment. Unnecessary services may be eliminated for reasons of restricting settings or the like.

[Main Menu Screen]

Figure 4:
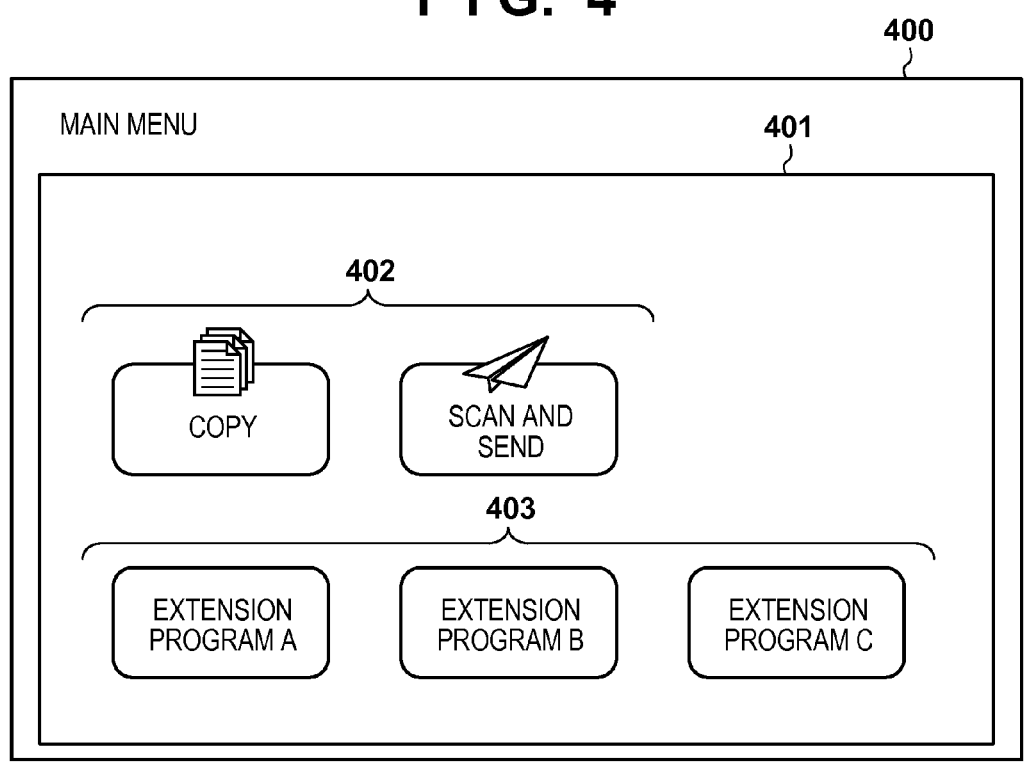
FIG. 4 is a view for illustrating an example configuration of a main menu screen of the image forming apparatus in accordance with the present application invention.

FIG. 4 is a view for illustrating an example configuration of a main menu screen 400 displayed on the operation unit 212 of the image forming apparatus 101. The main menu screen 400 has a program icon display area 401, standard program icons 402, and extension program icons 403. The program icon display area 401 is an area that displays icons for programs (functions) currently able to be operated through the image forming apparatus 101. Standard program icons 402 are icons for displaying a UI (not shown) for operating standard functions provided by a control program of the image forming apparatus 101. The extension program icons 403 are icons for displaying a UI (not shown) for operating the extension programs 305 installed on the image forming apparatus 101. The main menu screen 400 is displayed, for example, when power is turned on and when designated processing is complete or suspended.

[Download Program and Extension Program System Service]

Below, explanation will be given for the extension program system service 304, which is used in limitation management for the download program 500 and extension programs according to the present embodiment. FIG. 5 is a view for showing an example of a functional configuration of the download program 500 and the extension program system service 304. Each function is realized by the CPU 201 executing a program corresponding to said function.

In the present embodiment, the extension programs 305 are explained as being classified into three types. Each of the extension programs 305 is described through a Java (registered trademark) program, and is an application program able to be dynamically added to or deleted from the image forming apparatus 101. A first type is an applet type, which is an application displayed on the user interface of the operation unit 212. An applet type application is an application that is downloaded by the Web browser of the image forming apparatus 101, embedded in the Web browser and then executed. Note that a type of application that performs UI display or processing independently without being embedded in the Web browser is also included in the applet type. An instruction to activate or execute an application of the applet type is performed via the operation screen of the image forming apparatus 101.

A second type is a servlet type, which displays a user interface on a Web browser for a client that can access the network (not shown). An application of the servlet type is a module executed on the Web server, and is of a type that performs processing in accordance with an instruction from the Web browser for the client, and returns the result thereof to the client. An application of the servlet type is activated in accordance with a request transmitted by inputting a URL for a Web server for the application (for example, Web server 508) into the Web browser for the client. Then, in response to a request from the client side, processing is performed on the server side, and the processing result is returned to the client.

A third type is an esplet type that does not have an independent user interface, which is a type that activates in response to an instruction from an application or the like of the applet or servlet type, and then executes. Thus, the esplet type application has no function to display a UI, and requires collaboration with a different program to display specific information that relates to the application.

As shown above, each application has different presentation methods for information and a different user interface configuration, in accordance with the type thereof. Thus, in the present application invention, a presentation method for a processing result (such as a notification of a limit expiration for an application) is changed in accordance with the type. The specific method therefor is explained later alongside flowcharts or the like. Note that a Java (registered trademark) applet and Java (registered trademark) servlet or the like may be given as an example of an applet or servlet.

The download program 500 has an extension program information management unit 501, an extension program download unit 502, an extension program information display control unit 503, an extension program limitation management unit 504, an elapsed time management unit 505 and a use count management unit 506. The extension program information management unit 501 is a functional unit for managing information about the extension programs 305 that are able to be downloaded from the distribution server 103. The extension program information management unit 501 holds in advance identification information for the introduction program 900, which is explained later used FIG. 9, and key information, limitation information or the like necessary when downloading the introduction program 900. Also, the extension program information management unit 501 has a function of instructing the extension program download unit 502 to download the introduction program 900. A download instruction is performed based on identification information for the introduction program 900. Furthermore, the extension program information management unit 501 has a function for exchanging information with the introduction program 900. Note that identification information is information for uniquely identifying one of the extension programs 305 in the distribution server 103. Also, key information associated with authentication information more specifically corresponds to a license key, a product key, a license access number, or the like. The key information is necessary when downloading or installing an application, or when viewing applications that can be installed. In the present embodiment, for the image forming apparatus 101, the key information for each of the extension programs 305 is included in the introduction program 900.

The extension program download unit 502 uses key information or other information held by the introduction program 900 to download the extension programs 305 from the distribution server 103 and install the extension programs 305. The extension program information display control unit 503 obtains, from the extension program information management unit 501, information about those of the extension programs 305 that are able to be downloaded from the distribution server 103, configures a screen based on said information and provides said screen to a user via the operation unit 212. Furthermore, the extension program information display control unit 503 accepts a user operation via the provided screen.

The extension program limitation management unit 504 counts and manages a usage count and a usage duration by a function of the extension programs 305, through the elapsed time management unit 505 and the use count management unit 506. Furthermore, the extension program limitation management unit 504 performs limitation management for installed extension programs 305.

The extension program system service 304 has a use count management unit 507, a Web server 508, and an applet registration unit 509. The use count management unit 507 manages a count of a function, registered by an extension program, that is used by the image forming apparatus 101. For example, if the usage of the one of the extension programs 305 is restricted in accordance with a number of times that the extension programs 305 uses a color copy function, the download program 500 registers to the effect that the color copy function is managed to the use count management unit 507 of the extension program system service 304. The use count management unit 507 performs management by incrementing the function usage count each time the extension program uses the color copy function. Note that a function that is managed may be a function installed as standard on the image forming apparatus 101, or may be a function provided by another one of the extension programs 305.

When one of the extension programs 305 is of the servlet type, the Web server 508 registers a URL (Uniform Resource Locator) by which the one of the extension programs 305 operates. The applet registration unit 509 displays an expansion program icon for starting one of the extension programs on the operation unit 212 by registering the name of the one of the extension programs 305 and an expansion program icon 1008 that represents the one of the extension programs 305. When one of the extension programs 305 is of the applet type, applet registration is performed by the applet registration unit 509. Registration processing in accordance with each type is explained by FIG. 25.

[Introduction Program]

Figure 9:
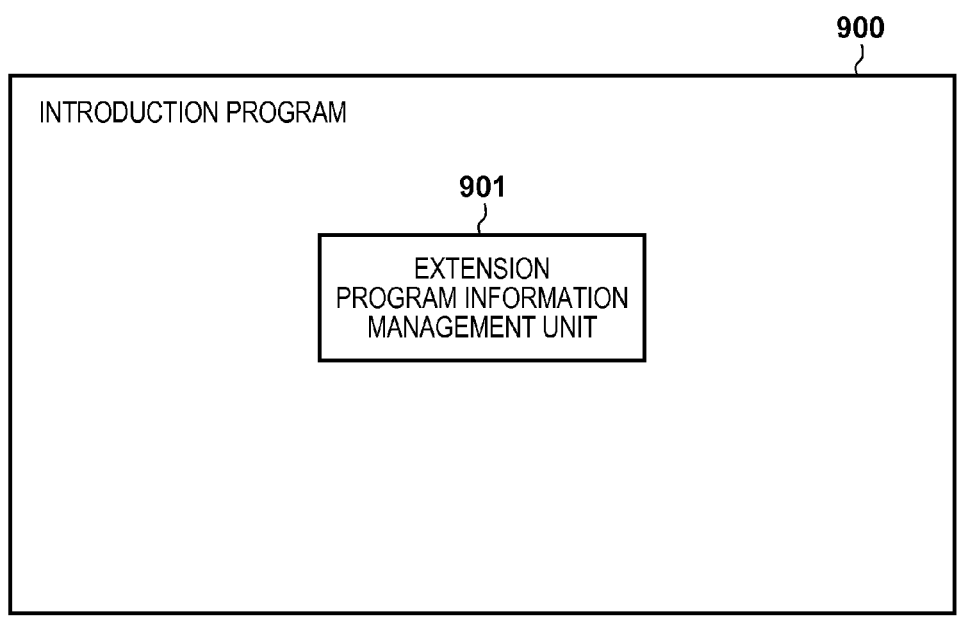
FIG. 9 is a view for showing an example of a functional configuration of an introduction program in accordance with the present application invention.

Hereinafter, explanation will be given for the introduction program 900 according to the present embodiment. FIG. 9 is a view for showing an example of a functional configuration of the introduction program 900. Each function is realized by the CPU 201 reading and executing a program corresponding to said function.

The introduction program 900 has an extension program information management unit 901. The extension program information management unit 901 notifies the download program 500 that information from the distribution server 103 about distributable extension programs (hereinafter, distributable extension program information) has been updated. The extension program information management unit 901 provides distributable extension program information 1000 to the download program 500.

[Distributable Extension Program Information]

Figure 10:
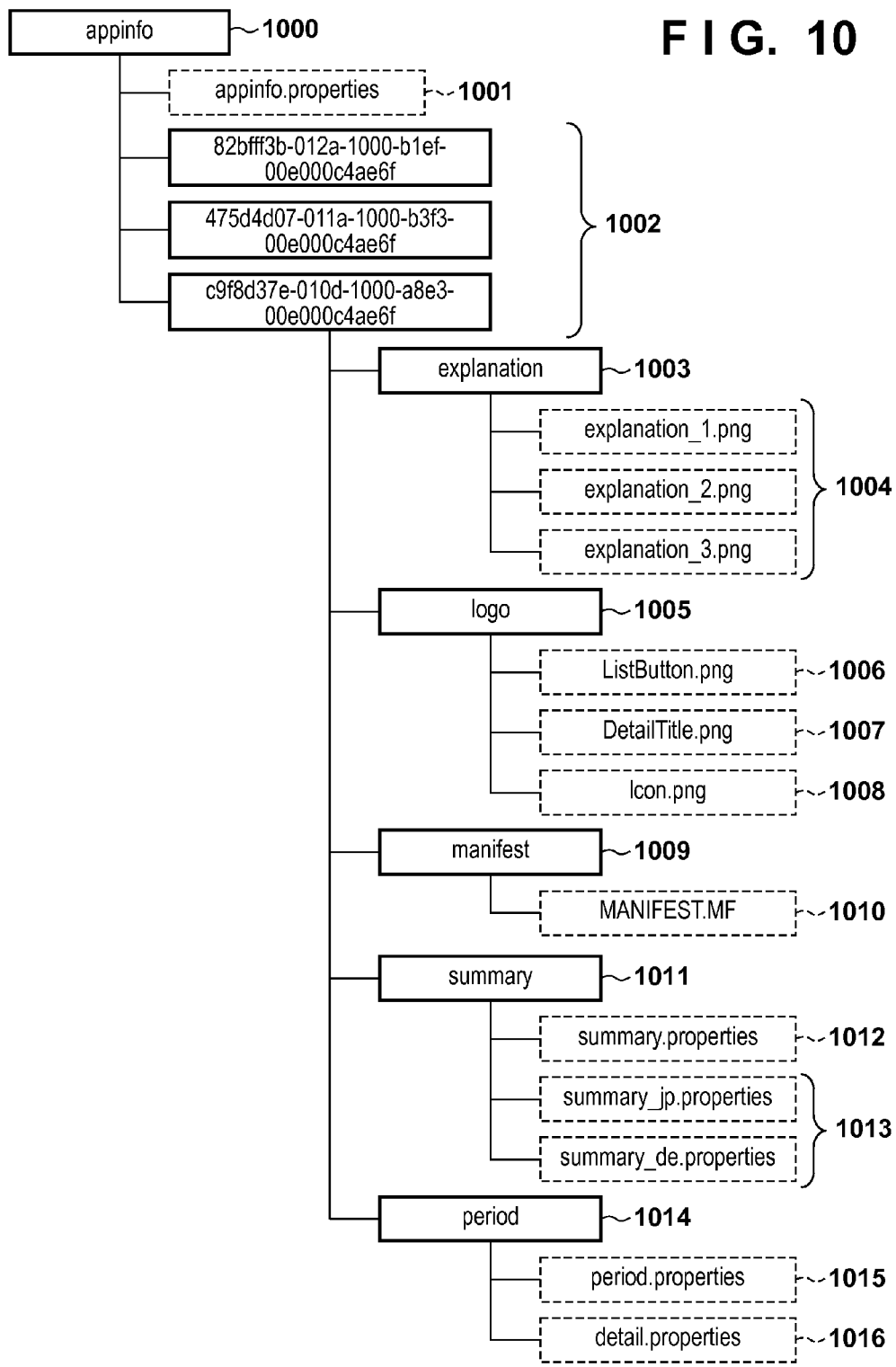
FIG. 10 is a view for showing an example of a distributable extension program information configuration in accordance with the present application invention.

Below, explanation will be given for the distributable extension program information according to the present embodiment. FIG. 10 is a view for illustrating an example configuration of the distributable extension program information 1000.

The distributable extension program information 1000 includes setting information 1001 and one or a plurality of pieces of extension program information 1002. The setting information 1001 is a setting file in which version information for the distributable extension program information 1000, identification information for the extension programs 305 included in the distributable extension program information 1000, or the like, are recorded. The extension program information 1002 is information for each of the extension programs 305 included in the distributable extension program information 1000, and here three distributable extension programs are indicated. The extension program information 1002 is information distinguished by identification information recorded in the setting information 1001. Each of the extension program information 1002 items includes explanation information 1003, logo information 1005, manifest information 1009, summary information 1011, and limitation information 1014.

The explanation information 1003 includes one or a plurality of explanation images 1004. Each of the explanation images 1004 is, for example, image data displayed by detailed information display panels 703 shown in FIGS. 7A and 7B, on each of which characteristics or the usage for one of the extension programs 305 is drawn. For example, by adding a sequential serial number that is a natural number to the file name for each of the explanation images 1004, it is possible to designate an order in which the explanation images 1004 are displayed. Additionally, in the present embodiment, the PNG format is shown as an example of the file format for image data included in the distributable extension program information 1000, but limitation is not made to this.

The logo information 1005 includes a list screen button logo 1006, a details screen title logo 1007, and the extension program icon 1008. The list screen button logo 1006 is image data displayed in extension program information buttons 602 shown on FIG. 6. The details screen title logo 1007 is image data displayed in a title image 702 shown on FIGS. 7A and 7B. The extension program icon 1008 corresponds to one of the extension program icons 403 displayed on the main menu screen 400 shown on FIG. 4 after the extension programs 305 are installed.

The manifest information 1009 includes a manifest file 1010. The manifest file 1010 is an extraction of files packaged in one of the extension programs 305. The manifest file 1010 is a file in which a version for a tool that generated the one of the extension programs 305, information about resources, such as a memory usage amount used when the one of the extension programs 305 is executed, and information such as a URL to call a servlet, or the like is recorded. Details of the manifest file 1010 will be explained later using FIGS. 14A and 14B.

The summary information 1011 includes a default summary information file 1012 and one or more localization summary information files 1013. The default summary information file 1012 and the localization summary information files 1013 record information not recorded in the manifest file 1010, such as an extension program name or overview descriptive text for an extension program. A localization summary information file 1013 is created when changing display content in response to a language setting of the image forming apparatus 101. The file name of the localization summary information file 1013 includes locale information for the corresponding language (for example, "ja" for Japanese and "de" for German). If there is no instance of the localization summary information file 1013 corresponding to the display language of the image forming apparatus 101, data from the default summary information file 1012 is used.

The limitation information 1014 includes a limitation information file 1015 and a limitation detailed information file 1016. The limitation information file 1015 records information such as a usable number of days for the one of the extension programs 305, a number of times each function can be used, a type of a function that has a restriction on the number of times usable, or whether the function will automatically stop when the number of times usable is restricted. Note that "the function will automatically stop" denotes that an extension program itself has a function of referring to information about a function use count, and automatically stopping when used a certain number of times. When "automatic-stop" 1603 is set to "true", the one of the extension programs 305 automatically stops when used the certain number of times. The limitation detailed information file 1016 records an application type 1701 for the one of the extension programs 305. Note that the application type of the one of the extension programs 305 may be included in the manifest file 1010.

Figure 11:
FIG. 11 is a view for showing an example of information included in distributable extension program information in accordance with the present application invention.

FIG. 11 is a view for illustrating an example configuration of the setting information 1001. The setting information 1001 includes version information 1101, list information 1102 and key information 1103. The version information 1101 is information that shows the version of the distributable extension program information 1000. List information 1102 is information that lists identification information for the extension programs 305 included in the distributable extension program information 1000. In an extension program list screen 600 shown in FIG. 6, the extension program information buttons 602 line up in the order described by the list information 1102. Key information 1103 is key information associated with identification information for uniquely identifying the extension programs 305 held by the distribution server 103. When downloading the extension programs 305 from the distribution server 103, the value of the key information 1103 associated with each piece of identification information is designated. The key information 1103 describes key information corresponding to all identification information enumerated by the list information 1102. For example, FIG. 10 shows "LicenseAccess-Number-82bfff3b-012a-1000-b1ef-00e000c4ae6f" as a key for identification information corresponding to the identification information "82bfff3b-012a-1000-b1ef-00e000c4ae6f", and the corresponding value is "1111222233337777".

FIG. 12A to FIG. 12C are views for showing examples of the explanation images 1004. The image data here is in the PNG format, and the file name is shown.

Figure 13A:
FIGS. 13A, 13B and 13C are views for showing examples of information included in the distributable extension program information in accordance with the present application invention.
Figure 13B:
Figure 13C:
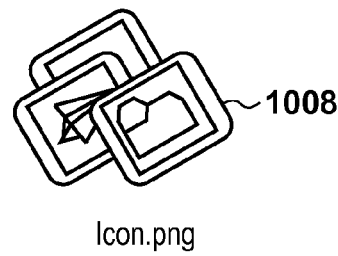

FIGS. 13A, 13B and 13C are views for showing examples of the logo information 1005. FIG. 13A is a view for showing an example of the list screen button logo 1006. FIG. 13B is a view for showing an example of the details screen title logo 1007. FIG. 13C is a view for showing an example of an icon that displays the extension program icons 403 on the main menu screen 400 when extension programs of the applet type are installed. The image data here is in the PNG format, and the file name is shown.

FIG. 14A is a view for illustrating an example configuration of the manifest file 1010. The manifest file 1010 includes two areas: a program information section 1401 and a resource information section 1402. The program information section 1401 describes information about one of the extension programs 305. Included in the program information section 1401 are an Application-Id for uniquely identifying the one of the extension programs 305, a Bundle-Name that shows the name of the one of the extension programs 305, a Bundle-Version that shows version information, or the like. The Application-Id corresponds to identification information included in the setting information 1001. The resource information section 1402 describes a resource amount used by an extension program. Included in the resource information section 1402 is a maximum memory usage amount (MaximumMemoryUsage), a maximum thread usage amount (MaximumThreadUsage), a maximum file space usage amount (MaximumFilespaceUsage), or the like, for the extension program.

FIG. 14B shows an example of the manifest file 1010 for one of the extension programs 305 of the servlet type. The manifest file 1010 for one of the extension programs 305 of the servlet type further includes a servlet information section 1403 as an area. The servlet information section 1403 describes a URL for using one of the extension programs 305 which itself is of servlet type as a servlet. Note that when the one of the extension programs 305 has a plurality of URLs, each URL is recorded with a comma delimiter. Additionally, information included in the manifest file 1010 is not limited to information shown here, and may further include information required when downloading or installing one of the extension programs 305.

FIGS. 15A and 15B are views for illustrating example configurations of the summary information 1011. FIG. 15A is a view for showing an example of the default summary information file 1012. FIG. 15B is a view for showing an example of a summary information file for Japanese in the localization summary information files 1013. The summary information 1011 includes extension program name information 1501 and extension program summary information 1502.

Figure 16A:
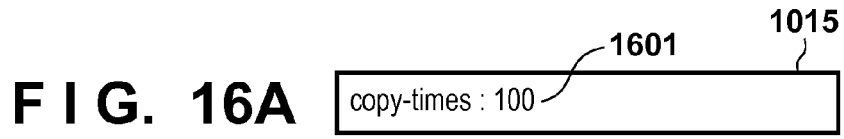
FIGS. 16A, 16B, 16C and 16D are views for showing examples of information included in the distributable extension program information in accordance with the present application invention.
Figure 16B:
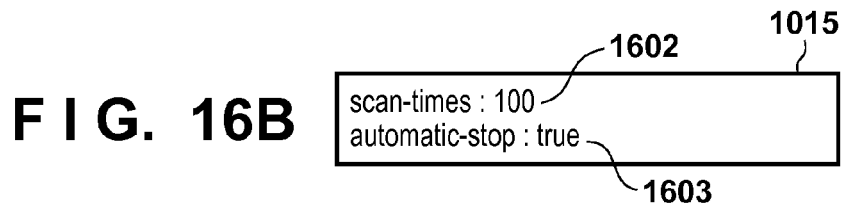

FIGS. 16A, 16B, 16C and 16D are views for illustrating example configurations of the limitation information file 1015. FIG. 16A and FIG. 16B show the definition of a restriction of a number of times a function of the one of the extension programs 305 is usable. FIG. 16A shows that it is possible to use a copy function 100 times. FIG. 16B shows that it is possible to use a scan function 100 times. The value of the "automatic-stop" 1603 is recorded as "true". This designation means that the one of the extension programs 305 corresponding to the limitation information file 1015 will stop when the scan function is used 100 times. This control is executed through the use count management unit 507 of the extension program system service 304.

Figure 16C:
Figure 16D:

FIG. 16C and FIG. 16D show definition of restriction of a usable number of days for one of the extension programs 305. The case of setting shown in FIG. 16C shows that the usable number of days for one of the extension programs 305 is 100 days. FIG. 16D shows an example in which a usable number of days restriction is not designated. Here the value of "available-days" 1605 is recorded as "false". Note that when a usable number of times restriction or a usable number of days restriction is not designated, a state of not recording anything in the limitation information file 1015 or a configuration of not having the limitation information file 1015 itself may be taken.

Figure 17A:
FIGS. 17A, 17B and 17C are views for showing examples of information included in the distributable extension program information in accordance with the present application invention.
Figure 17B:
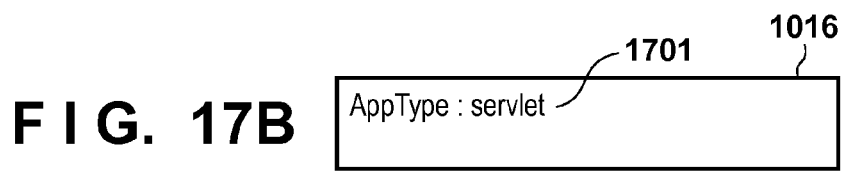
Figure 17C:
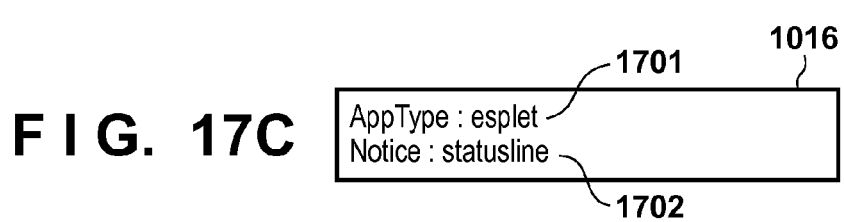

FIGS. 17A, 17B, 17C are views for illustrating example configurations of the limitation detailed information file 1016. FIG. 17A shows that the one of the extension programs 305 is an applet type. FIG. 17B shows that the one of the extension programs 305 is a servlet type. FIG. 17C shows that the one of the extension programs 305 is an esplet type.

An example of a configuration of the distributable extension program information 1000, shown in FIG. 10, and data included therein were described, but these are not limited to the foregoing. For example, configuration may be taken such that a display or a layout of an image is further defined in detail.

FIG. 18A shows an information management table 1800 that manages the distributable extension program information 1000 in the extension program information management unit 501. The information management table 1800 includes an Application-Id 1801, a Bundle-Name 1802, an application type 1803, an extended program usable day number 1804, an extended program usable count 1805, and a function type 1806 for the function for which the extension programs 305 restricts a usable number of times.

FIG. 18B shows a limitation management table 1810 that manages the state of limitation information and the extension programs 305, on the basis of an Application-Id in the distributable extension program information 1000, in the extension program limitation management unit 504. The limitation management table 1810 includes the Application-Id 1801, a number of days elapsed 1807 after starting an extension program, a use count 1808 for usage of the function of the extension program, and a status 1809 of the extension program.

The value of the number of days elapsed 1807 of the limitation management table 1810 is incremented by each number of days that elapse since the one of the extension programs 305 is installed. The value of the use count 1808 is also incremented each time the one of the extension programs 305 uses the function designated by the function type 1806. The status 1809 becomes a "start" status when the extension program is started, and a "limit expiration" status in the case of limit expiration. Note that configuration may also be taken such that other statuses can be set in accordance with an installation status.

[Download Process for an Extension Program]

Upon receiving an instruction from a user, the download program 500 performs control to download one of the extension programs 305 from the distribution server 103 and install the one of the extension programs 305. Using FIG. 21, explanation will be given below of a process for downloading the one of the extension programs 305. Step S2101 to step S2104 represent each step.

In step S2101, the download program 500 uses the key information 1103 and the identification information for the introduction program 900, held by the extension program information management unit 501, to request one of the extension programs 305 from the distribution server 103.

In step S2102, upon receiving the request, as a response the distribution server 103 replies to the download program 500 with the one of the extension programs 305 corresponding to the identification information and the key information 1103.

In step S2103, the download program 500 instructs the extension program execution platform 303 to install the one of the extension programs 305 received from the distribution server 103.

In step S2104, the extension program execution platform 303 executes the installation of the one of the extension programs 305 which is designated, and notifies the download program 500 of the installation result. This processing flow then terminates.

Additionally, before the processing of step S2101, the download program 500 may perform processing to use the identification information and the key information 1103 to perform, towards the distribution server 103, a query about the one of the extension programs 305 designated by a user, and, based on the response to the query, determine whether it is possible to download and install the one of the extension programs 305 without any problem.

[Download Process for Introduction Program]

At a time such as when the download program 500 is first activated, or a predetermined date and a time is reached, or a time when the download program 500 receives an update instruction from a user (pressing an update button 604 in FIG. 6), the download program 500 queries the distribution server 103 for information about the introduction program 900. The download program 500 then, as necessary, downloads the introduction program 900 from the distribution server 103 and installs the introduction program 900. Using FIG. 19, explanation will be given below of a process for downloading the introduction program 900. Step S1901 to step S1907 represent each step.

In step S1901, the download program 500 uses the key information 1103 and the identification information for the introduction program 900, held by the extension program information management unit 501, to request information of the introduction program 900 from the distribution server 103. Here, information of a version of the introduction program 900 which can be distributed is included in the requested information.

In step S1902, upon receiving the request, the distribution server 103 replies to the download program 500 with the response of extension program information corresponding to the identification information and the key information 1103 (that is, information that includes information of a version of the introduction program 900).

In step S1903, the download program 500 compares the version information for the instance of the introduction program 900 that is currently installed with the version information included in the information about the introduction program 900 received from the distribution server 103.

If the version information differs, the download program 500 performs step S1904, enabling the download of the new version of the introduction program 900. However, if the version information matches, the download program 500 determines that it is unnecessary to download the introduction program 900 from the distribution server 103 as the latest version of the introduction program 900 is installed, and this processing flow terminates.

In step S1904, the download program 500 uses the identification information and the key information 1103 for the introduction program 900 to request the latest version of the introduction program 900 from the distribution server 103.

In step S1905, upon receiving the request, as a response the distribution server 103 replies to the download program 500 with the introduction program 900 corresponding to the identification information and the key information 1103.

In step S1906, the download program 500 instructs the extension program execution platform 303 to install the introduction program 900 received from the distribution server 103.

In step S1907, the extension program execution platform 303 performs the installation of the introduction program 900, and notifies the download program 500 of the result of said installation. This processing flow is then terminated.

[Update Processing]

When started, the introduction program 900 notifies the download program 500 that the distributable extension program information 1000 has been updated. In response to the update notification from the introduction program 900, the download program 500 obtains the distributable extension program information 1000 from the introduction program 900. Using FIG. 20, explanation will be given below of a process for updating the introduction program 900. Step S2001 to step S2007 represent each step.

In step S2001, the extension program execution platform 303 generates the introduction program 900. This generation indicates disposing and configuring the introduction program 900 that was downloaded within the image forming apparatus 101 so that the introduction program 900 can be executed. Thus, the introduction program 900 is loaded into the RAM 202, and enters a state of being able to be executed by the CPU 201.

In step S2002, the extension program execution platform 303 instructs start of the introduction program 900.

In step S2003, the introduction program 900 notifies the download program 500 to the effect that the distributable extension program information 1000 has been updated.

In step S2004, upon receiving an update notification from the introduction program 900, as a response the download program 500 makes a request to the introduction program 900 to obtain the distributable extension program information 1000.

In step S2005, upon receiving the request from the download program 500, the introduction program 900, as a response, transmits the distributable extension program information 1000 to the download program 500. For the distributable extension program information 1000 that is transmitted, configuration may be taken such that only an updated differential is transmitted, or configuration may be taken such that the entirety of the distributable extension program information 1000 after the update is transmitted.

In step S2006, upon receiving the distributable extension program information 1000 after the update from the introduction program 900, the download program 500 transmits the result of updating processing to the introduction program 900.

In step S2007, upon receiving the result of updating processing for the distributable extension program information 1000 from the download program 500, the introduction program 900 transmits the result of start processing to the extension program execution platform 303. This processing flow is then terminated.

[Extension Program Information Display]

Using FIG. 6, FIG. 7A, and FIG. 7B, explanation will be given for screens the download program 500 displays on the operation unit 212.

Figure 6:
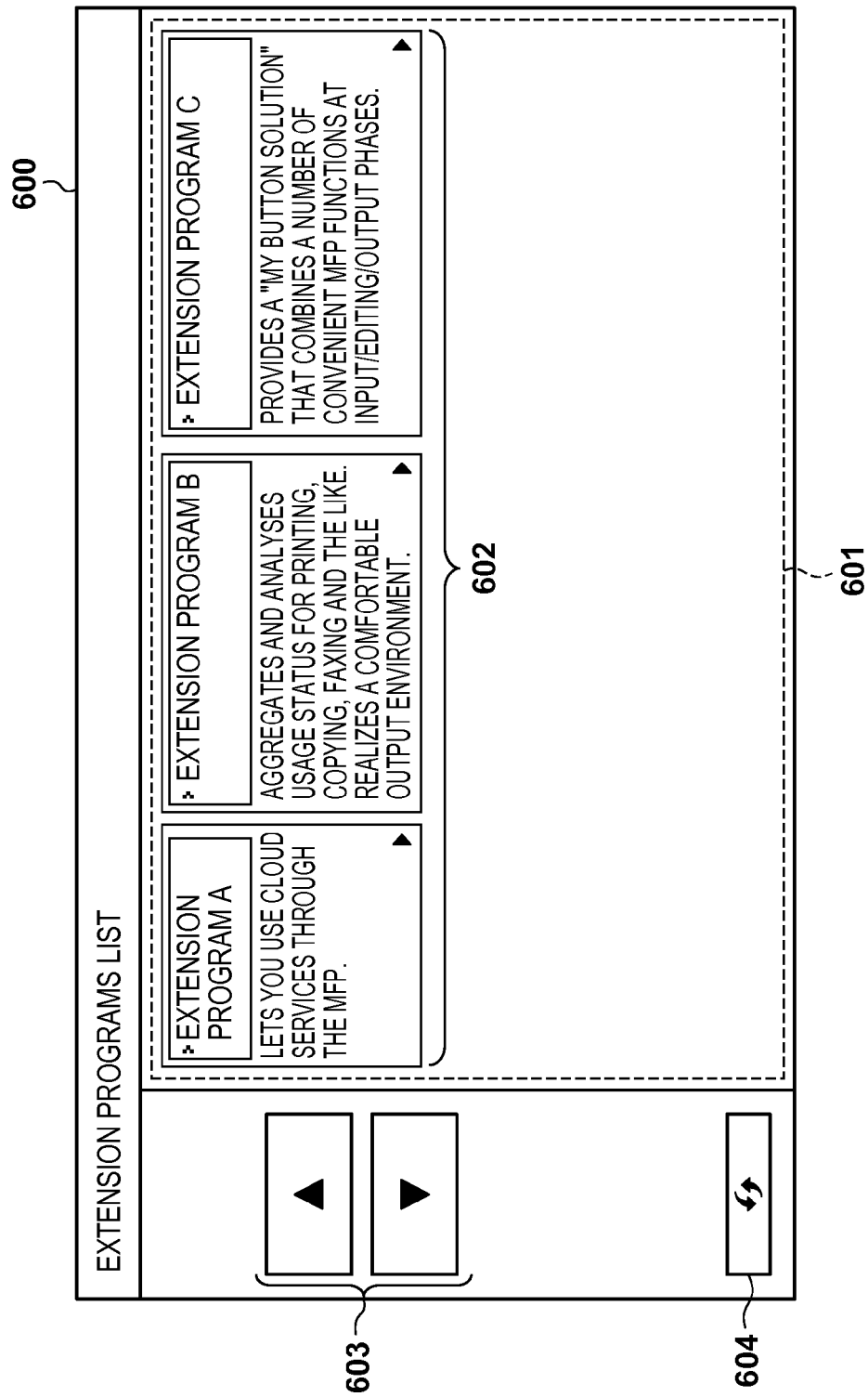
FIG. 6 is a view for showing an example of a distributable extension program list screen in accordance with the present application invention.

FIG. 6 is a view for showing an example of the extension program list screen 600 that the download program 500 displays on the operation unit 212. The extension program list screen 600 has a button display panel 601, the extension program information buttons 602, change buttons 603 and the update button 604. The button display panel 601 is a panel for handling the extension program information buttons 602 together. There are cases where a plurality of button display panels 601 are prepared in accordance with the number of the extension program information buttons 602. Extension program information buttons 602 are buttons that display an overview of the extension programs 305 that are distributable by combining an image and text. Upon detecting that one of the extension program information buttons 602 has been pressed, the download program 500 displays a detailed information screen 700, which is explained later using FIGS. 7A and 7B. Change buttons 603 are buttons for changing the button display panel 601 to be displayed when there is a plurality of the button display panel 601. The update button 604 is a button for updating the distributable extension program information 1000 held by the download program 500. In other words, the processing flow shown in FIG. 19 is performed when the update button 604 is pressed.

Figure 7B:
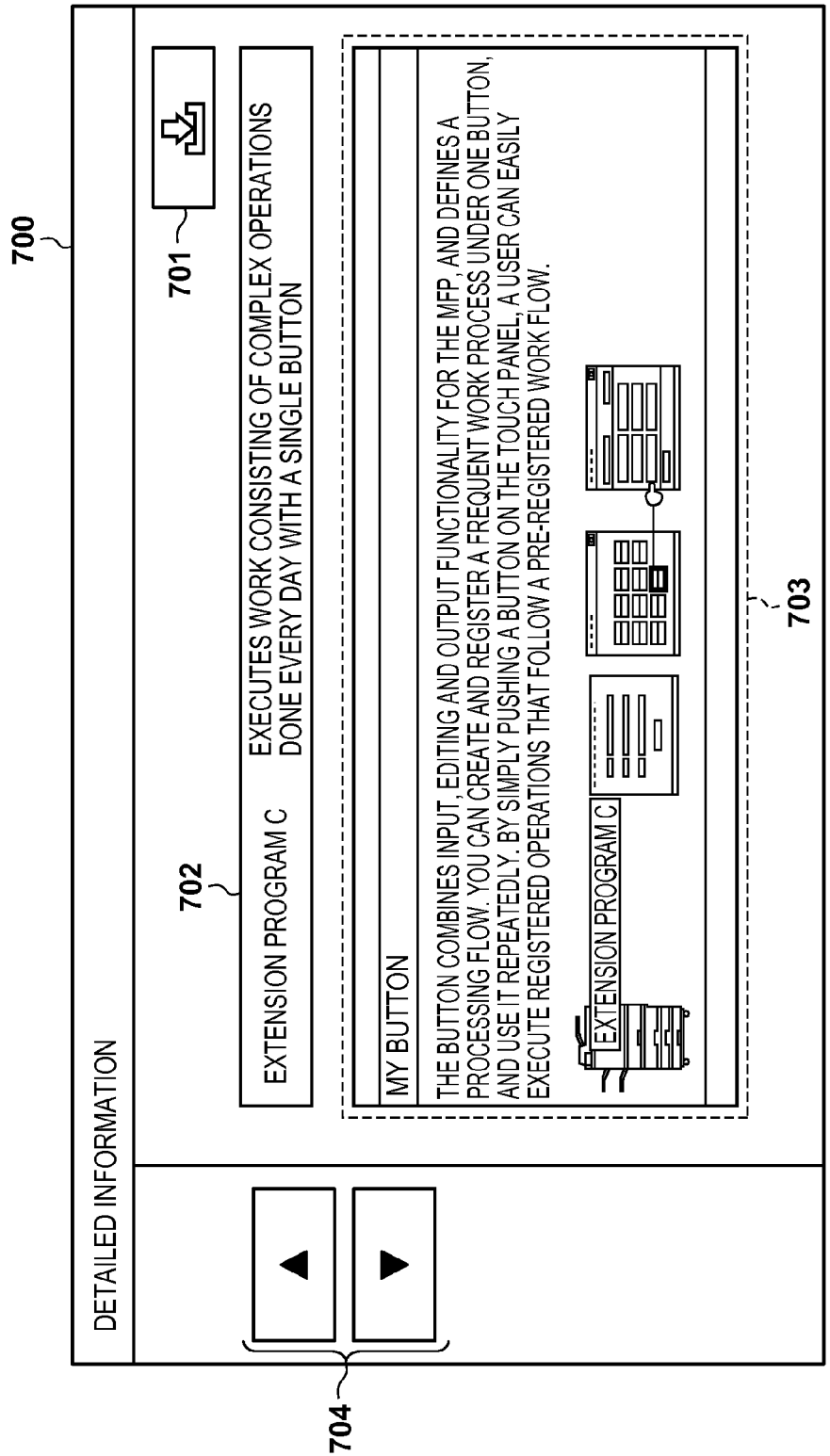

FIGS. 7A and 7B are views for showing examples of detailed information screens 700 the download program 500 displays on the operation unit 212. FIG. 7A shows an example configuration of a screen when the one of the extension programs 305 that is displayed is able to be downloaded and installed without any problem. FIG. 7B shows an example of a screen when downloading and installing the one of the extension programs 305 that is displayed is restricted. A case of already being downloaded, a case of expiration of an installation limitation, or the like may be given as a reason for restricting download or the like here.

The icon for a download button 701 is different in FIG. 7A and FIG. 7B. The process to change the icon for the download button 701 will be explained later. The detailed information screen 700 has the download button 701, the title image 702, a detailed information display panel 703 and change buttons 704. The download button 701 is a button for instructing the download and installation of the one of the extension programs 305 for which detailed information is displayed.

The title image 702 is an image of the title of the one of the extension programs 305. The detailed information display panel 703 is a panel for displaying an image on which the characteristics or usage of one of the extension programs 305 is drawn. There may be cases where a plurality of the detailed information display panel 703 are prepared in accordance with the number of images on which characteristics or usage is drawn. The detailed information display panel 703 corresponds to the explanation images 1004 shown in FIGS. 12A to 12C. The change buttons 704 of the detailed information display panel are buttons for changing the detailed information display panel 703 which is displayed in a case where there is a plurality of the detailed information display panel 703.

[Button Display Change Processing]

Figure 22:
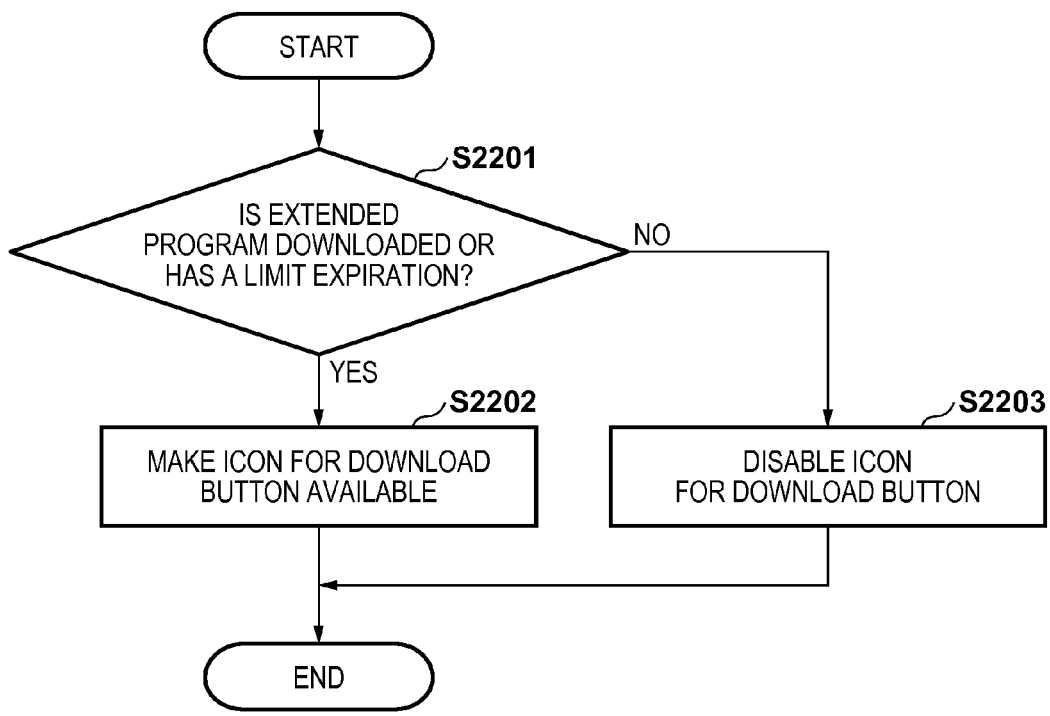
FIG. 22 is a view showing an icon change process for a download button according to the present application invention.

FIG. 22 is a flowchart for showing an example of a change process for the download button 701. Step S2201 to step S2203 represent each step.

In step S2201, the download program 500 determines whether a distributable extension program 305 has been downloaded, or has a limit expiration. If the one of the extension programs 305 has been downloaded or has a limit expiration (YES in step S2201), processing transitions to step S2202, otherwise (NO in step S2201) processing transitions to step S2203.

In step S2202, the download program 500 obtains the default icon for the download button 701 (that is, the image shown in FIG. 7A) held by the download program 500, and sets the default icon as the icon for the download button 701.

In step S2203, the download program 500 obtains an invalid icon (that is, an image shown in FIG. 7B), and sets the obtained icon as the icon for the download button 701. This processing flow is then terminated.

[Extension Program Download And Installation]

Figure 23:
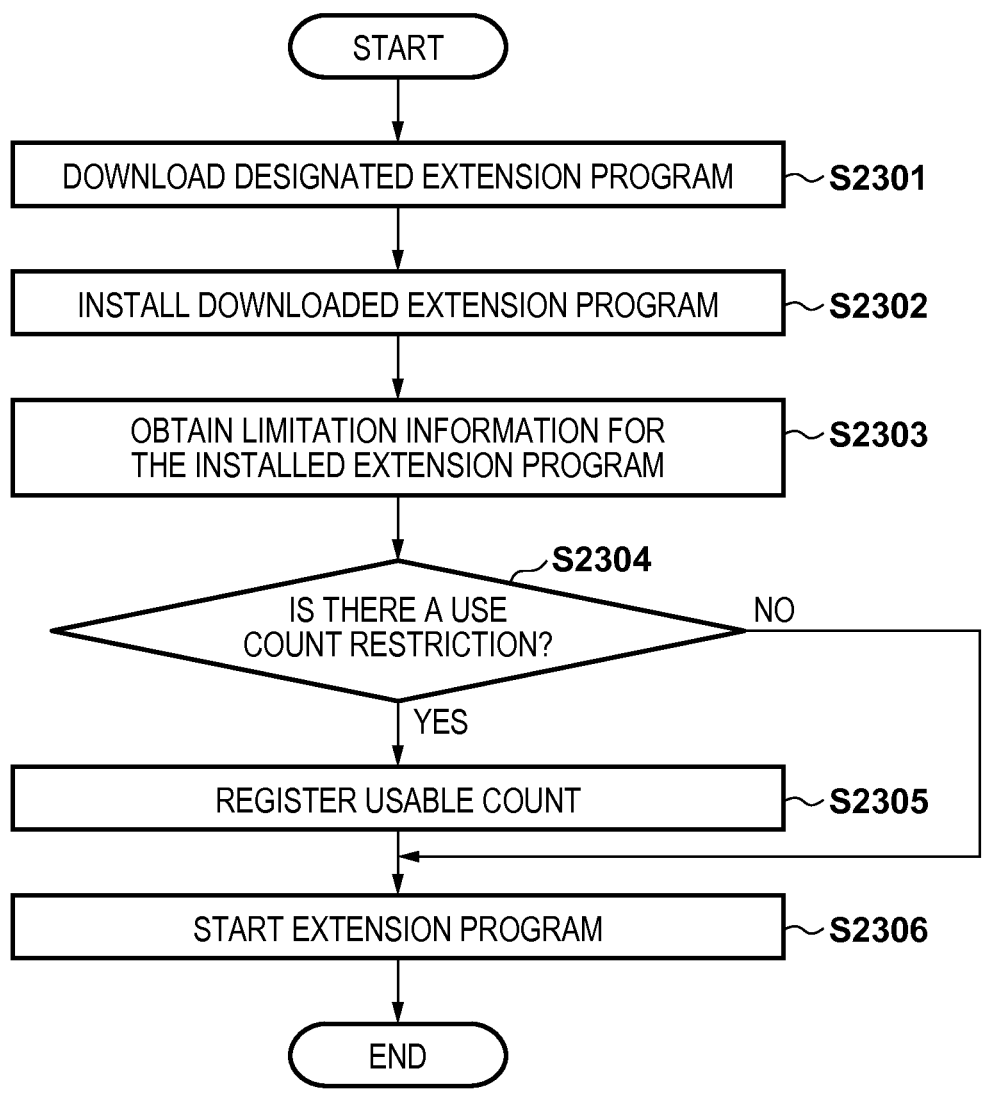
FIG. 23 is a view for showing an install process for the extension program in accordance with the present application invention.

Upon detecting that the download button 701 has been pressed via the detailed information screen 700, the download program 500 downloads the designated one of the extension programs 305 from the distribution server 103, and installs the designated one of the extension programs 305 into the extension program execution platform 303. Using FIG. 23, explanation will be given below of extension program download and install processes. Step S2301 to step S2315 represent each step.

In step S2301, the download program 500 uses the key information 1103 and identification information obtained from the introduction program 900 to download the one of the extension programs 305 designated by a user from the distribution server 103. In step S2302, the download program 500 then, installs the extension program downloaded from the distribution server 103.

In step S2303, the download program 500 obtains the limitation information 1014 for an installed one of the extension programs 305 from the distributable extension program information 1000 held. In step S2304, the download program 500 determines whether there is a function use count restriction in the limitation information 1014. More specifically, determination is made whether the limitation information file 1015 is included and whether there is a setting regarding a limitation. If there is a function use count restriction in the limitation information 1014 (YES in step S2304), processing transitions to step S2305, and when that is not the case (NO in step S2304), processing transitions to step S2306.

In step S2305, the download program 500 determines that there is a function with a usable count restriction for the installed one of the extension programs 305, and registers the designated function usable count in the use count management unit 507 of the extension program system service 304. For example, if a usable count for a copy function is restricted to 100 times, a copy function restriction count of 100 times is registered to the use count management unit 507 of the extension program system service 304.

In step S2306, the download program 500 starts the installed one of the extension programs 305. This processing flow then terminates.

[Extension Program Limitation Management]

Figure 24:
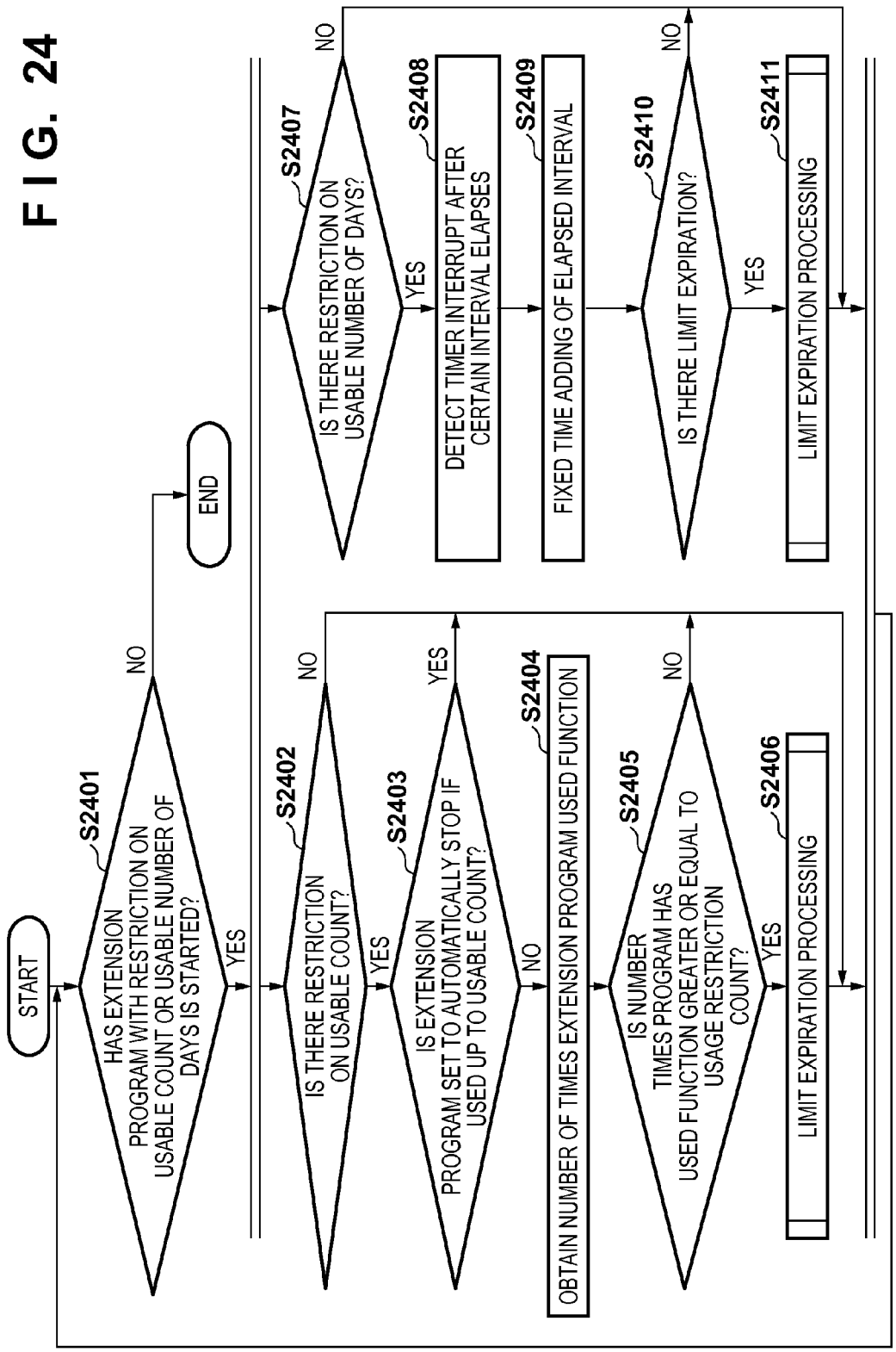
FIG. 24 is a view for showing a limitation management process for the extension program in accordance with the present application invention.

Upon starting one of the extension programs 305, the download program 500 starts limitation management of the one of the extension programs 305. Using FIG. 24, explanation will be given below of limitation management processing for an extension program. Step S2401 to step S2422 represent each step.

In step S2401, the download program 500 determines whether there is an extension program with a limitation, out of the extension programs 305 that are started. Whether there is a limitation can be determined by whether, after referencing the information management table 1800, there is a restriction on a usable number of times for a function or a usable number of days for the extension programs 305. If there is not one of the extension programs 305 having a restriction on a usable number of times for a function or a usable number of days (NO in step S2401), this processing flow terminates as it is unnecessary to perform limitation management for the extension programs 305 that are installed. If there is one of the extension programs 305 having a restriction on a usable number of times for a function or a usable number of days (YES in step S2401), processing transitions to each of step S2402 and step S2407, and limitation management of the one of the extension programs 305 is performed. Step S2402 to step S2406 is processing for the case in which there is restriction on a use count, and step S2407 to step S2411 is processing for the case in which there is restriction on a number of days used. Note that step S2402 and step S2407 are processed in parallel on the one of the extension programs 305, and execute limitation management on the one of the extension programs 305 in accordance with set restriction information.

In step S2402, the download program 500 refers to the limitation information 1014 held by the extension program information management unit 501, and determines whether there is a restriction on a usable count for a function. If there is a restriction on a usable count for a function (YES in step S2402), a transition is made to step S2403.

In step S2403, the download program 500 determines a number of times the one of the extension programs 305 subject to limitation management has used the function, and determines whether it is an extension program that stops automatically when the usable count restriction is reached. More specifically, as shown in FIG. 16B, this is referring to the "automatic-stop" 1603 included in the limitation information file 1015, and determining whether the value thereof is "true". If the one of the extension programs 305 automatically stops (YES in step S2403), transition is made to step S2401 as limitation management is not necessary because the one of the extension programs 305 automatically stops when a limitation is reached. When the one of the extension programs 305 does not stop automatically (NO in step S2403), transition is made to step S2404.

In step S2404, the download program 500 obtains the number of times that the one of the extension programs 305 has used a designated function, via the use count management unit 507 of the extension program system service 304. In other words, for one of the extension programs 305 that is not set to automatically stop, monitoring is performed by periodically polling information about a use count for that one of the extension programs 305.

In step S2405, the download program 500 determines whether the function use count obtained in step S2404 is greater than or equal to the usable number of times for the one of the extension programs 305. If the number of times that the extension programs 305 has used the function is greater than or equal to the usable number of times (YES in step S2405), a transition is made to step S2406 because there is a limit expiration for the one of the extension programs 305. Processing of step S2406 will be explained later. If the number of times that the one of the extension programs 305 has used the function is less than the usable number of times (NO in step S2405), a transition is made to step S2401 to continuously execute limitation management for the extension programs 305.

Meanwhile, in step S2407, the download program 500 refers to the limitation information 1014 held by the extension program information management unit 501, and determines whether there is a restriction on a usable number of days. If there is a restriction on a usable number of days (YES in step S2407), a transition is made to step S2408.

In step S2408, the download program 500 detects an interrupt from a timer after a fixed interval has elapsed. The interrupt here may be generated in a unit of one day, or configuration may be taken such that generation is by using another time unit.

In step S2409, the download program 500 adds the elapsed time detected in step S2408 to the usage elapsed time for the one of the extension programs 305.

In step S2410, the download program 500 determines whether the elapsed time calculated in step S2409 is greater than the usable number of days for the one of the extension programs 305. When greater than the usable number of days for the one of the extension programs 305 (YES in step S2410), a transition is made to step S2411. Processing of step S2411 will be explained later. When not greater than the usable number of days for the one of the extension programs 305 (NO in step S2410), a transition is made to step S2401 to continue to execute limitation management of the extension programs 305.

The download program 500 executes processing at a time of a limit expiration (step S2406 and step S2411) to the one of the extension programs 305 that has exceeded the usable number of days or usable count, and then performs uninstallation control for the one of the extension programs 305. Note that when others of the extension programs 305 that require limitation management have been started, processing of step S2401 to step S2411 is continuously executed through another process, and limitation management for the others of the extension programs 305 is continued.

[Extension Program Limitation Expiration Processing]

In step S2406 and step S2411, when the download program 500 determines that a limitation, under which the one of the extension programs 305 is usable, has expired, the download program 500 starts limit expiration processing for the one of the extension programs 305. The download program 500 instructs the extension program download unit 502 to uninstall the one of the extension programs 305 for which there is a limit expiration. The extension program download unit 502 stops the one of the extension programs 305 for which the instruction was received, and instructs the extension program execution platform 303 to execute uninstallation.

Therefore, according to the present embodiment, it is possible to realize usage of an extension program for just a fixed interval or a fixed number of times by giving the extension program a limitation, without editing an existing extension program.

<Second Embodiment>

Explanation will be given of a different embodiment according to the present application invention. The first embodiment illustrated an example of performing limitation management for an extension program, and performing uninstallation without notifying a user to make an extension program with a limit expiration unusable. However, when the system automatically uninstalls the extension program, there is the possibility that the user is suddenly unable to use the extension program and is not aware of the reason why the extension program is not usable. So in the present embodiment, explanation will be given for a means of notifying a user of an extension program with a limit expiration.

[Limitation Notification Means Designation]

Because an esplet type one of the extension programs 305 does not have a UI on either the operation unit 212 or on a client Web browser (not shown), a means for notifying a limit expiration is designated in the limitation detailed information file 1016. As shown in FIG. 17C, if the notifying means for limit expiration of the one of the extension programs is designated as "statusline", the limit expiration is displayed on the status line of the main menu screen 400 (FIG. 8C) when the limitation of the one of the extension programs 305 has expired. If nothing is designated as the notifying means, then only the detailed information screen 700 displays the limit expiration. Note that the notifying means set here is not limited to displaying on the status line of the main menu screen 400, and configuration may be taken such that the notifying means can be set so as it is possible to display in another position or another screen.

[Extension Program Limit Expiration Information Display]

When an extension program has a limit expiration, the extension program information display control unit 503 of the download program 500 has a function of configuring information notifying that the limit expiration occurred with a screen, and providing the screen to a user through the operation unit 212 or the network I/F 210.

Below, explanation will be given, using FIG. 8A to FIG. 8D, of a notification screen displayed on the operation unit 212 or a client Web browser (not shown) when one of the extension programs 305 has a limit expiration. FIG. 8A to FIG. 8D are views for illustrating example configurations of a screen the download program 500 uses to notify a user of a limit expiration when limit expiration occurs for usage of one of the extension programs 305.

Figure 8A:
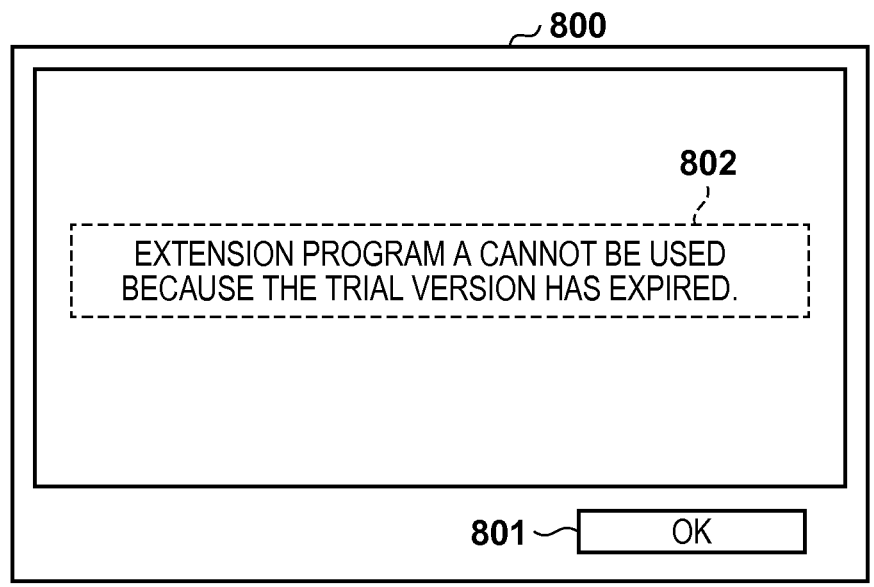
FIGS. 8A, 8B, 8C and 8D are views for showing examples of screens notifying a limit expiration of an extension program in accordance with the present application invention.

FIG. 8A is an example configuration of a screen notifying a user of a limit expiration on the operation unit 212 when a limit expiration occurs for an applet type of one of the extension programs 305. A limit expiration notification screen 800 shown on FIG. 8A has a confirmation button 801 for closing the screen after there is confirmation of the limit expiration, and a limit expiration notification display panel 802. The limit expiration notification screen 800 notifies a user of a message notifying the name of the one of the extension programs 305 together with the limit expiration of an application, in accordance with the application type of the one of the extension programs 305.

Figure 8B:
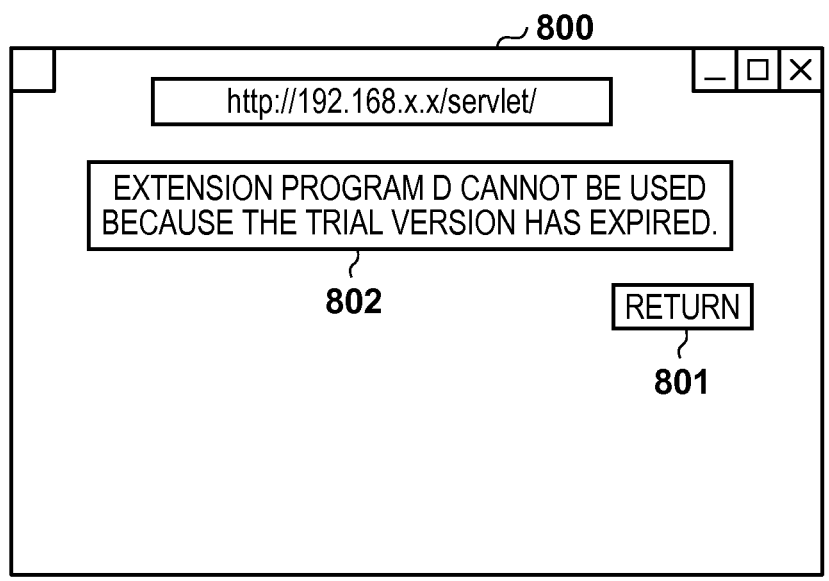

FIG. 8B is the example configuration of a screen, displayed on a Web browser that has accessed a URL that operates a servlet, that notifies a user of a limit expiration, when a limit expiration has occurred for one of the extension programs 305 of the servlet type. When a user is using the one of the extension programs 305, it is possible to confirm a limit expiration for an extension program through a URL accessed by using a Web browser. The limit expiration notification screen 800 shown on FIG. 8B has the confirmation button 801 for transitioning from the screen after there is confirmation of the limit expiration, and the limit expiration notification display panel 802.

Figure 8C:
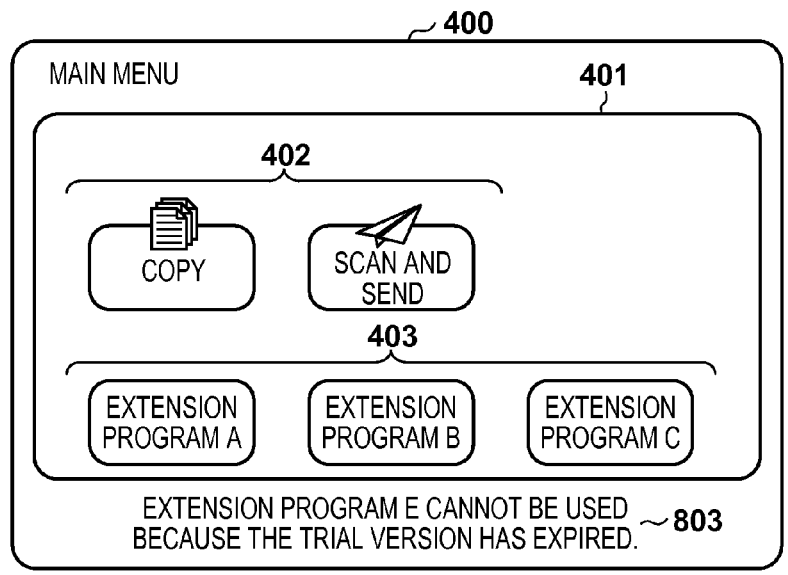

FIG. 8C is an example of a screen for notifying a user of a limit expiration in a case in which one of the extension programs 305 of the esplet type has a limit expiration and a "statusline" has been designated in the limitation detailed information file 1016 corresponding to the one of the extension programs 305. For the esplet type, a user is notified by displaying to the effect of a limit expiration on a status line 803 of the main menu screen 400 displayed on the operation unit 212.

Figure 8D:
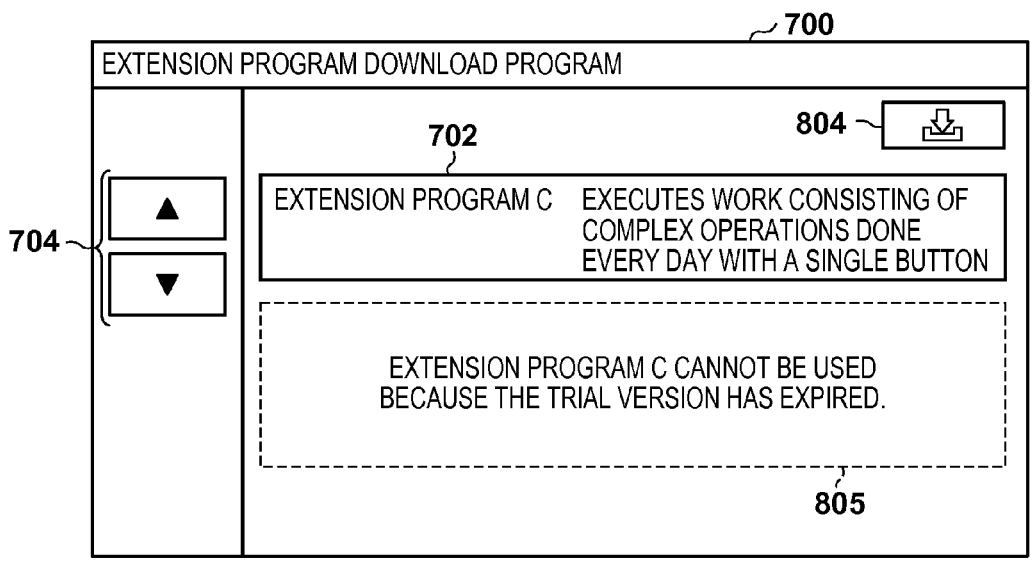

FIG. 8D is a screen for a case in which there is a limit expiration for a displayed one of the extension programs 305, when displaying the detailed information screen 700, notifying to that effect. With the detailed information screen 700 shown in FIG. 8D, a download button 804 is controlled so as to be unselectable, and instead of the detailed information as shown on the detailed information display panels 703 in FIGS. 7A and 7B, information to the effect of limit expiration is displayed. The screen shown on FIG. 8D can be displayed when a limit expiration has occurred for one of the extension programs 305 whatever the type.

[Extension Program Limit Expiration Processing]

Upon determining that a usable limitation for one of the extension programs 305 has expired, the download program 500 starts processing to notify a user of the limit expiration, as limit expiration processing for the extension program. Using FIG. 25, explanation will be given below of limit expiration processing for one of the extension programs 305. Step S2501 to step S2514 represent each step.

In step S2501, the download program 500 causes one of the extension programs 305, which has been determined to have a limit expiration by the extension program download unit 502, to stop.

In step S2502, the download program 500 obtains name information for the stopped one of the extension programs 305 from the information management table 1800, which is managed by the extension program information management unit 501.

In step S2503, the download program 500 obtains the application type for the stopped one of the extension programs 305 from the information management table 1800, which is managed by the extension program information management unit 501.

In step S2504, the download program 500 determines the application type for the stopped one of the extension programs 305, based on the application type for the one of the extension programs 305 obtained in step S2503. If the application type of the stopped one of the extension programs 305 is the applet type, a transition is made to step S2505. If the application type of the stopped one of the extension programs 305 is the servlet type, a transition is made to step S2508. If the application type of the stopped one of the extension programs 305 is the esplet type, a transition is made to step S2511.

If the one of the extension programs 305 is of the applet type, in step S2505, the download program 500 obtains the extension program icon 1008 from the extension program information management unit 501.

In step S2506, the download program 500 associates and registers in the applet registration unit 509 the name information for the one of the extension programs 305 obtained in step S2502, and the icon for the one of the extension programs 305 obtained in step S2505.

In step S2507, the download program 500 stores an association between the name information for the one of the extension programs 305 registered in the applet registration unit 509, and data (for example, a message shown on the limit expiration notification display panel 802 of FIG. 8A) displayed when the icon registered in the applet registration unit 509 is pressed. By associating and registering the name information and icon for the one of the extension programs 305 in the applet registration unit 509, the icon for the one of the extension programs 305 and the name information for the one of the extension programs 305, which are displayed the main menu screen 400, are registered. Thus, when the icon for a stopped one of the extension programs 305 is pressed by a user, the download program 500 uses the registered information to display a screen notifying of a limit expiration on the operation unit 212, as with FIG. 8A.

If the one of the extension programs is of the servlet type, in step S2508, the download program 500 obtains the URL used for the one of the extension programs 305 of the servlet type from the extension program information management unit 501.

In step S2509, the download program 500 registers the name information for the one of the extension programs 305 obtained in step S2502, and the URL obtained in step S2508 in the Web server 508 for the extension program system service 304.

In step S2510, the download program 500 stores an association between the name information for the one of the extension programs registered in the Web server 508 for the extension program system service 304, and data displayed on the Web browser when the URL for the one of the extension programs 305 of the servlet type is accessed. Thus, when a user accesses the URL for the one of the extension programs 305 of the servlet type, the download program 500 uses the registered information to display a screen notifying of the name information for the one of the extension programs 305 and a limit expiration as with FIG. 8B.

If the one of the extension programs 305 is of the esplet type, in step S2511, the download program 500 determines whether a means to notify of a limit expiration for the one of the extension programs 305 has been designated. That is, determining whether a means such as the "statusline", as shown in FIG. 17C, has been set. If a means to notify to the effect that there is a limit expiration for the one of the extension programs is not designated (NO in step S2511), a transition is made to step S2513. If a means to notify to the effect that there is a limit expiration for the one of the extension programs 305 is designated (YES in step S2511), a transition is made to step S2512.

In step S2512, the download program 500 displays to the effect that there is a limit expiration for the one of the extension programs 305 on the operation unit 212, through the extension program information display control unit 503. Because the one of the extension programs 305 of the esplet type does not have a UI, for example, if "statusline" has been set at step S2511, the name information for the extension program and something to the effect that there is a limit expiration are displayed by the status line 803 in a lower part of the main menu screen 400, as in FIG. 8C.

In step S2513, the download program 500 displays that there is a limit expiration to the detailed information screen 700. In the present embodiment, even for one of the extension programs 305 for which a means of notifying a limit expiration is not designated, such as for one of the extension programs 305 of the esplet type, it is possible for the user to confirm the limit expiration and non-usability by displaying the detailed information screen 700.

In step S2514, the download program 500 instructs the uninstallation of the one of the extension programs 305 for which the limit expiration occurred. This processing flow is then terminated.

By executing the present flowchart, it is possible to set an extension program having a limit expiration as unusable, and notify a user who was using the extension program that there is a limit expiration for the extension program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-158991, filed Aug. 4, 2014, which is hereby incorporated by reference herein in its entirety.

What is claimed is:

1. A program management method in an information processing apparatus provided with an extension unit for performing control to download an extension program for extending functionality from an external server and to install the extension program, the method comprising:

by the extension unit, performing control to download from the external server an introduction program that provides information about an extension program which can be downloaded from the external server, and to install the introduction program;

obtaining, from the installed introduction program, information about the extension program which can be downloaded;

performing control to download the extension program that can be downloaded from the external server and install the extension program that can be downloaded, based on the information obtained from the introduction program in the obtaining, in response to receiving an instruction to install the extension program which can be downloaded; and stopping the installed extension program, based on limitation information for the extension program, which is included in the information obtained from the introduction program by the obtaining, and performing control to uninstall; and displaying, when the control to uninstall is performed based on the limitation information, a notification screen for notifying that uninstallation is performed due to a limit expiration, wherein in the stopping, if a type of the stopped extension program is an applet type, when an icon displayed in a main menu is pressed, screen data for displaying a notification of the limit expiration of the extension program and the icon are associated and stored, and if the type of the stopped extension program is a servlet type, a URL of the extension program is obtained, and screen data for displaying a notification of the limit by a Web browser of an access resource when the URL is accessed, and the URL are associated and stored, wherein any one of screen data stored in the stopping is displayed in the displaying, and wherein if the type of the stopped extension program is an esplet type, a notification of the limit expiration of the extension program is displayed on a status line within the main menu in the displaying.

2. An information processing apparatus provided with an extension unit for performing control to download an extension program for extending functionality from an external server and to install the extension program, the information processing apparatus comprising:

one or more processors; and at least one memory coupled to the one or more processors, the at least one memory including instructions stored thereon which, when executed by the one or more processors cause the information processing apparatus to:

perform control to download from the external server an introduction program that provides information about an extension program which can be downloaded from the external server, and install the introduction program, obtain, from the installed introduction program, information about the extension program which can be downloaded, perform control to download the extension program that can be downloaded from the external server and install the extension program that can be downloaded, based on the information obtained from the introduction program, in response to receiving an instruction to install the extension program which can be downloaded, and stop the installed extension program, based on limitation information for the extension program, which is included in the information obtained from the introduction program, and perform control to uninstall; and a display unit configured to display, when control to uninstall is performed based on the limitation information, a notification screen for notifying that uninstallation is performed due to a limit expiration, wherein the instructions, when executed by the one or more processors, further cause the information processing apparatus to:

if a type of the stopped extension program is an applet type, when an icon displayed in a main menu is pressed, associate and store screen data for displaying a notification of the limit expiration of the extension program and the icon, and if the type of the stopped extension program is a servlet type, obtain a Uniform Resource Locator (URL) of the extension program, and associate and store the URL and screen data for displaying a notification of the limit by a Web browser of an access resource when the URL is accessed, wherein the display unit displays any one of the stored screen data, and wherein the display unit displays, if the type of the stopped extension program is an esplet type, a notification of the limit expiration of the extension program on a status line within the main menu.

3. The information processing apparatus according to claim 2, wherein the limitation information defines a restriction based on at least one of a use count for the extension program or a number of days elapsed since the installation of the extension program.

4. The information processing apparatus according to claim 2, wherein the limitation information defines a use count restriction for each function used by the extension program.

5. The information processing apparatus according to claim 2, wherein the limitation information includes a setting of whether to perform control to uninstall an extension program without displaying the notification screen through the display unit when there is a limit expiration for that extension program, and the display unit changes display of the notification screen based on the setting.

6. The information processing apparatus according to claim 2, wherein the control to uninstall the extension program is not performed when the extension program, for which an install instruction is received from a user, is provided with a function of stopping itself if a restriction defined in the limitation information is reached.

7. A non-transitory computer readable medium storing a program that when executed, causes a computer having a display unit to:

perform control to download from an external server an introduction program that provides information about an extension program which can be downloaded from the external server, and to install the introduction program;

obtain, from the installed introduction program, information about the extension program which can be downloaded;

perform control to download the extension program that can be downloaded from the external server and install the extension program that can be downloaded, based on the information obtained from the introduction program by the obtaining unit, in response to receiving an instruction to install the extension program which can be downloaded;

stop the installed extension program, based on limitation information for the extension program, which is included in the information obtained from the introduction program, and perform control to uninstall; and display by the display unit, when the control to uninstall is based on the limitation information, a notification screen for notifying that uninstallation is performed due to a limit expiration, wherein the program, when executed, further causes the computer to, if a type of the stopped extension program is an applet type, when an icon displayed in a main menu is pressed, associate and store screen data for displaying a notification of the limit expiration of the extension program and the icon, and if the type of the stopped extension program is a servlet type, obtain a URL of the extension program, and associate and store the URL and screen data for displaying a notification of the limit by a Web browser of an access resource when the URL is accessed, wherein the display unit displays any one of screen data stored by the uninstall control unit, and wherein the display unit displays, if the type of the stopped extension program is an esplet type, a notification of the limit expiration of the extension program on a status line within the main menu.

* * * * *